United States Patent
Meiners

(10) Patent No.: US 12,299,784 B2
(45) Date of Patent: May 13, 2025

(54) FLOOR PLAN EXTRACTION

(71) Applicant: PassiveLogic, Inc., Salt Lake City, UT (US)

(72) Inventor: Justin Meiners, Murray, UT (US)

(73) Assignee: PassiveLogic, Inc., Holladay, UT (US)

( * ) Notice: Subject to any disclaimer, the term of this patent is extended or adjusted under 35 U.S.C. 154(b) by 355 days.

(21) Appl. No.: 17/855,513

(22) Filed: Jun. 30, 2022

(65) Prior Publication Data
US 2024/0005570 A1    Jan. 4, 2024

(51) Int. Cl.
*G06T 11/20* (2006.01)
*G06T 7/73* (2017.01)

(52) U.S. Cl.
CPC .............. *G06T 11/203* (2013.01); *G06T 7/73* (2017.01); *G06T 2207/10028* (2013.01)

(58) Field of Classification Search
CPC ..................... G06T 11/203; G06T 7/73; G06T 2207/10028
See application file for complete search history.

(56) References Cited

U.S. PATENT DOCUMENTS

| | | | |
|---|---|---|---|
| 5,787,133 A | 7/1998 | Marchetto et al. | |
| 10,445,895 B2 | 10/2019 | Knorr et al. | |
| 10,785,413 B2 | 9/2020 | Malia et al. | |
| 2006/0103545 A1 | 5/2006 | Tsou | |
| 2009/0217063 A1 | 8/2009 | Tomita | |
| 2015/0227645 A1* | 8/2015 | Childs | G06F 30/13 703/1 |
| 2020/0284883 A1 | 9/2020 | Ferreira et al. | |
| 2021/0073449 A1* | 3/2021 | Segev | G06F 30/27 |
| 2021/0208262 A1 | 7/2021 | Silver et al. | |
| 2022/0406013 A1 | 12/2022 | Xiong et al. | |

OTHER PUBLICATIONS

Niklas Larsson, "A study on the use of ARKit to extract and geo-reference floor plans" (Year: 2021).*
Alzantot et al., "CrowdInside: Automatic Construction of Indoor Floorplans", Sep. 17, 2012, DOI: 10.1145/2424321.2424335 Source: arXiv.
ARRayCastQuery, Apple Developer Documentation Kit, copyright 2021, https://developer.apple.com/documentation/arkit/arraycastquery, last accessed Dec. 15, 2021.
ARRaycastResult, Apple Developer Documentation Kit, copyright 2021, https://developer.apple.com/documentation/arkit/arraycastresult, last accessed Dec. 15, 2021.
Raycast(_:), Apple Developer Documentation Kit, copyright 2021, https://developer.apple.com/documentation/arkit/arsession/3132065-raycast/t, last accessed Dec. 15, 2021.

(Continued)

*Primary Examiner* — Yi Yang

(57) ABSTRACT

A loop shape representing a floor plan is extracted from an imperfect or incomplete floor plan scan by applying building construction techniques to fill in missing information. The floor plan is shown to the user during all stages of assembly, allowing the user to make a purposeful mark on the display, changing how the incomplete scan is interpreted. Whenever a marking is placed the floor plan is regenerated.

20 Claims, 18 Drawing Sheets

(56) References Cited

OTHER PUBLICATIONS

Scratchapixel 2.0, Ray Tracing: Rendering a Triangle, copyright 2016-2021, https://www.scratchapixel.com/lessons/3d-basic-rendering/ray-tracing-rendering-a-triangle, last viewed Dec. 15, 2021.

Han, J., Liu, Y., Rong, M., Zheng, X. and Shen, S., 2023. FloorUSG: Indoor floorplan reconstruction by unifying 2D semantics and 3D geometry. ISPRS Journal of Photogrammetry and Remote Sensing, 196, pp. 490-501.

Henry, P., Krainin, M., Herbst, E., Ren, X. and Fox, D., 2014. RGB-D mapping: Using depth cameras for dense 3D modeling of indoor environments. In Experimental robotics: The 12th international symposium on experimental robotics (pp. 477-491). Springer Berlin Heidelberg.

Majercik, A., Crass in, C., Shirley, P. and McGuire, M., 2018. A ray-box intersection algorithm and efficient dynamic voxel rendering. Journal of Computer Graphics Techniques vol. 7(3), pp. 66-81.

Written Opinion of the International Searching Authority for International application No. PCT/US2022/043838, Dec. 22, 2022.

Written Opinion of the International Searching Authority for International application No. PCT/US22/41528, Apr. 7, 2023.

Written Opinion of the International Search Authority, 2024-12022.

\* cited by examiner

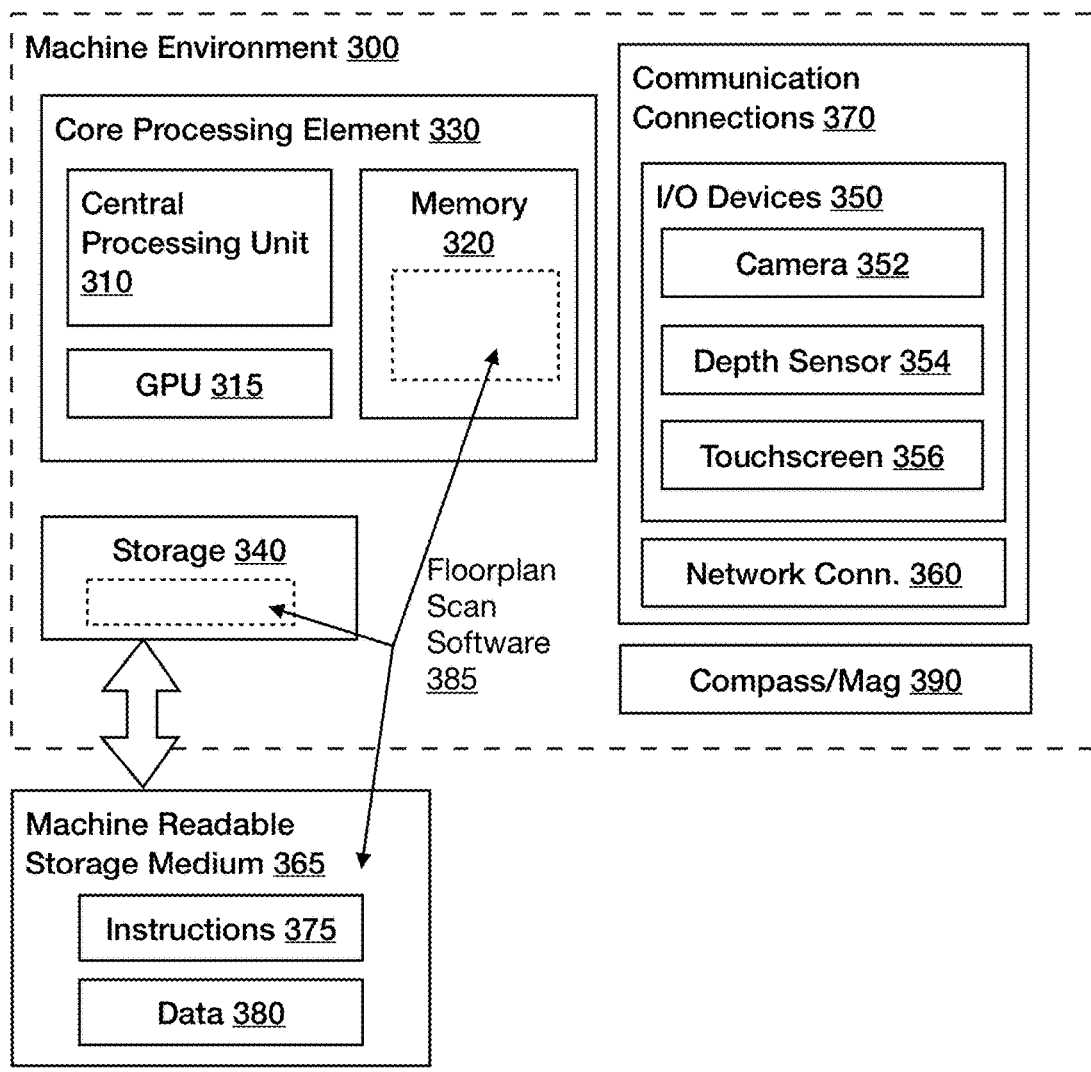
FIG. 3
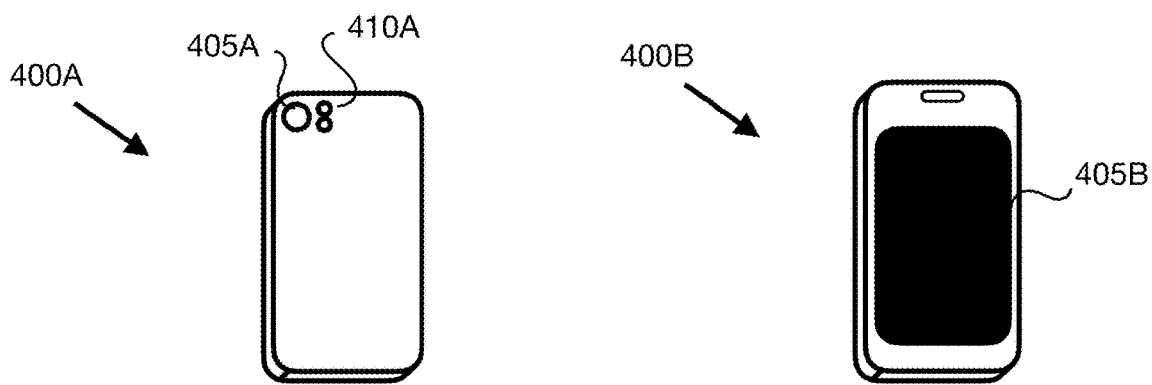
FIG. 4A         FIG. 4B

FLOOR PLAN EXTRACTION

FIELD OF INVENTION

The present disclosure relates to creating floor plans and models of a building; more specifically, but not exclusively, the present disclosure relates to creating connected floor plans using an imperfect floor plan scan.

BACKGROUND

People have long attempted to create floor plans using techniques more automated than using a measuring tape and graph paper. Scanning systems have been created using depth detection and ranging that create a point cloud of assorted surfaces within a building. However, turning the point clouds into understandable floor plans is a very complex problem. The concept of a floor plan seems intuitive, but it is difficult to define rigorously. For example, a definition such as "walkable area with all furniture removed" is insufficient because structures that are not a portion of the floor plan, such as cabinets, fireplaces, steps, etc would all be included. To show the difficulty, a vertical slice of 3-D geometry that was generated from a LiDAR depth scanner is shown in FIG. 1 at 100. Notice that some lines are walls, e.g., 105, while others are noise, e.g., 110. In this slice, one can probably deduce the lines which make up the floor plan, but doing so implicitly uses prior knowledge of how buildings are constructed. This experience helps our brain ignore superfluous information and insert missing details. Furthermore, the decision of what the floor plan is not based on geometry alone; rather, It includes an understanding of how the space is used (its purpose) and what the person deems important at that time. Floor plan definition is often in terms of use or aesthetic, rather than geometry. For example, whether adjacent areas are considered separate rooms or not may require human input. As another example, is a fireplace part of a floor plan outline? It may be a fundamental part of the structure, but someone may still draw the floor plan without it. For these and other reasons, though it appears that a human, knowing what the floor plan should look like, could draw in the missing gaps, as shown in FIG. 2 at 200, it is a very difficult job for a computer. Previous implementations have been slow and laborious, to the extent that the complex modeling allowed may take a significant number of computer hours to perform, and still require human intervention. These processes also require mastery of complex, technical steps that may take years to master. It would be of benefit to be able to generate a floor plan automatically in a short time, with intuitive user input when needed.

SUMMARY

A brief summary of various embodiment is presented below. Some simplifications and omissions may be made in the following summary, which is intended to highlight and introduce some aspects of the various embodiments, but not to limit the scope of embodiments described herein. Detailed descriptions of embodiments adequate to allow those of ordinary skill in the art to make and use the inventive concepts will follow in later sections.

Embodiments include a method for extracting a floor plan from an imperfect floor plan scan composed of known line segments, comprising using a processor to generate a more-optimized floor plan; displaying, by a user device with 3-D depth scanner and a 2-D camera, the more-optimized floor plan; receiving feedback indicative of accuracy of the more-optimized floor plan by use of the 3-D depth scanner and the 2-D camera; and in response to the feedback, using the processor to adjust the more-optimized floor plan based on the feedback.

The method may include receiving feedback indicative of accuracy of the floor plan comprises receiving a wall marking from a reading from the 3-D depth scanner and the 2-D camera, the wall marking comprising multiple positions and multiple orientations of a location in 2-D and 3-D, the wall marking indicated on the user device by a user.

The method may also include processing multiple positions and multiple orientations of a location in 2-D and 3-D to determine a directed line segment, with the directed line segment being added to the known line segments.

The method may include the processor processes the multiple positions and multiple orientations of a location in 2-D and 3-D to determine a directed line segment further comprises using both depth scanner measurements and camera measurements to determine an average of the multiple positions and the multiple orientations.

The method may include for each line segment within the known line segments, extending the line segment by a known amount creating an extended line segment associated with the line segment with a same orientation, and creating a second line segment of a second size perpendicular to and touching the line segment; adding the extended line segment and the second line segment to a set of extended line segments; for each two extended line segments within the set of extended line segments, adding intersections whose line segment orientations are similar to a set of intersections, and finding a possible edge path between two line segments associated with the extended line segments; creating a cost graph comprising a vertex set and an edge set, wherein the vertex set comprises vertices representing a midpoint of each line segment, and wherein the edge set comprises edges, each edge comprising an intersection within the set of possible intersections, a starting vertex of the intersection, an ending vertex of the intersection and a cost, wherein the cost includes length from the starting vertex to the ending vertex and aesthetic costs; and iteratively: in the cost graph, choose an edge with a lowest cost, giving a chosen edge; add the chosen edge to a floor plan graph; and delete each edge with the starting vertex equal to the chosen edge starting vertex; until the floor plan graph forms a loop.

The method may include adding the chosen edge to the floor plan graph comprises adding the possible edge path between the two line segments to the floor plan graph.

The method of finding a possible end path may include: determining a first angle between two nearest ends of the two line segments; determining a second angle between a far end of a first of the two line segments and a far end of a second of the two line segments; and when the first angle is below a first threshold amount and the second angle is below a second threshold amount joining the first of the two line segments and the second of the two line segments.

The method may include when the first angle is above the first threshold amount or the second line segment is above the second threshold amount then zig-zagging the two line segments.

The method may include when zigzagging the two line segments, creating a new line segment perpendicular to and between the first of the two line segments and extending a near end of the two line segments to the new line segment.

The method may include a weighting value being added to the cost.

Embodiments also include a system for extracting a floor plan from an imperfect floor plan scan composed of line segments, the system comprising: a memory; a processor in operable communication with the memory, and a LiDAR-enabled user device with a display, the processor configured to for extracting a floor plan from an imperfect floor plan scan composed of known line segments, comprising: generating a more-optimized floor plan by applying a heuristic to the imperfect floor plan scan; displaying, by the LiDAR-enabled user device, the more-optimized floor plan; receiving feedback from a user using the LiDAR-enabled user device indicative of accuracy of the floor plan; and in response to the feedback, adjusting the more-optimized floor plan based on the feedback.

A line segment in the system may include an orientation, and the known line segments may include line segments.

Applying a heuristic to the imperfect floor plan scan within the system may include: for each line segment within the known line segments, extending the line segment by a known amount creating an extended line segment associated with the line segment with a same orientation, and creating a second line segment of a second size perpendicular to and touching the line segment; adding the extended line segment and the second line segment to a set of extended line segments; for each two extended line segments within the set of extended line segments, adding possible intersections whose line segment orientations associated with the extended line segments are similar to a set of possible intersections, and finding a possible edge path between two line segments associated with the extended line segments; creating a cost graph comprising a vertex set and an edge set, wherein the vertex set comprises vertices representing a midpoint of each line segment, and wherein the edge set comprises edges, each edge comprising an intersection within the set of possible intersections, a starting vertex of the intersection, an ending vertex of the intersection and a cost, wherein the cost includes length from the starting vertex to the ending vertex to the ending vertex and aesthetic costs; and iteratively: in the cost graph, choose an edge with a lowest cost, giving a chosen edge; adding the chosen edge to a floor plan graph; and deleting each edge with the starting vertex equal to the chosen edge starting vertex; until the floor plan graph forms a loop.

Receiving feedback from a user using the LiDAR-enabled user device indicative of accuracy of the floor plan within the system comprises the display showing a portion of a structure corresponding to the imperfect floor plan scan, and receiving a purposeful mark made on the display.

The processor may processes the purposeful mark to create a directed line segment, and may add the directed line segment to the known line segments The processor adjusting the optimized floor plan based on display may involve regenerating the optimized floor plan.

Embodiments also include a non-transitory machine-readable storage medium configured with data and instructions which upon execution by at least one processor cause one or more devices to perform a method of extracting a floor plan from an imperfect floor plan scan composed of known line segments, the method comprising: using a processor to generate an optimized floor plan by applying a heuristic to the imperfect floor plan scan; displaying, by a LiDAR-enabled user device, the optimized floor plan; receiving feedback indicative of accuracy of the floor plan by use of the LiDAR-enabled user device; and in response to the feedback, using the processor to adjust the optimized floor plan based on the feedback.

Embodiments of the non-transitory storage medium also include: for each line segment within the known line segments, extending the line segment by a known amount creating an extended line segment associated with the line segment with a same orientation, and creating a second line segment of a second size perpendicular to and touching the line segment; adding the extended line segment and the second line segment to a set of extended line segments; for each two extended line segments within the set of extended line segments, adding possible intersections, whose line segment orientations associated with the extended line segments are similar, to a set of possible intersections, and finding a possible edge path between two line segments associated with the extended line segments; create a cost graph comprising a vertex set and an edge set, wherein the vertex set comprises vertices representing a midpoint of each line segment, and wherein the edge set comprises edges, each edge comprising an intersection within the set of possible intersections, a starting vertex of the intersection, an ending vertex of the intersection and a cost, wherein the cost includes length from the starting vertex to the ending vertex and aesthetic costs; and iteratively: in the cost graph, choose an edge with a lowest cost, giving a chosen edge; add the chosen edge to a floor plan graph; and delete each edge with the starting vertex equal to the chosen edge starting vertex; until the floor plan graph forms a loop.

Embodiments of the non-transitory storage medium also include the LiDAR-enabled user device further comprising a display, and receiving feedback from a user using the LiDAR-enabled user device indicative of accuracy of the floor plan comprises the display showing a portion of a structure corresponding to the imperfect floor plan scan, and receiving a purposeful mark made on the display.

Embodiments of the non-transitory storage medium also include the optimized floor plan being used to modify equipment location at a location represented by the imperfect floor plan scan.

These, and other, aspects of the invention will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

BRIEF DESCRIPTION OF THE FIGURES

Non-limiting and non-exhaustive embodiments of the present embodiments are described with reference to the following FIGURES, wherein:

FIG. 3 illustrates a generalized example of a suitable computing environment 300 in which described embodiments may be implemented;

FIG. 4A illustrates an example of a diagram of the back of an example camera and depth detection device that may be used in some described embodiments;

FIG. 4B illustrates an example of a diagram of the front of an example camera and depth detection device that may be used in some described embodiments;

DETAILED DESCRIPTION

Figure 1:
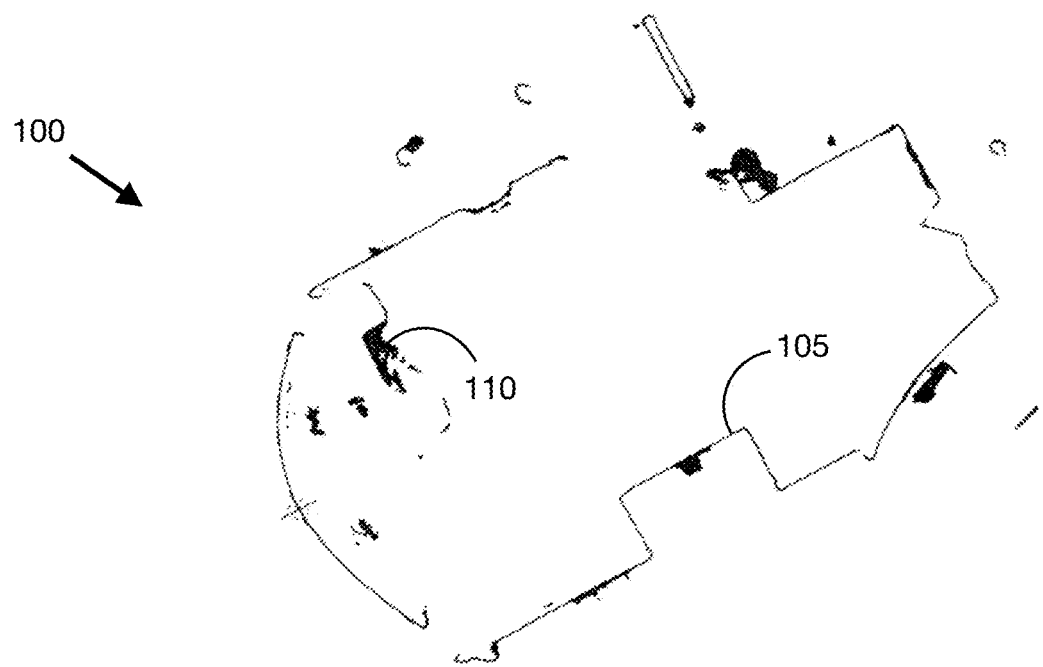
FIG. 1 illustrates an example of an imperfect floor plan scan.
Figure 2:
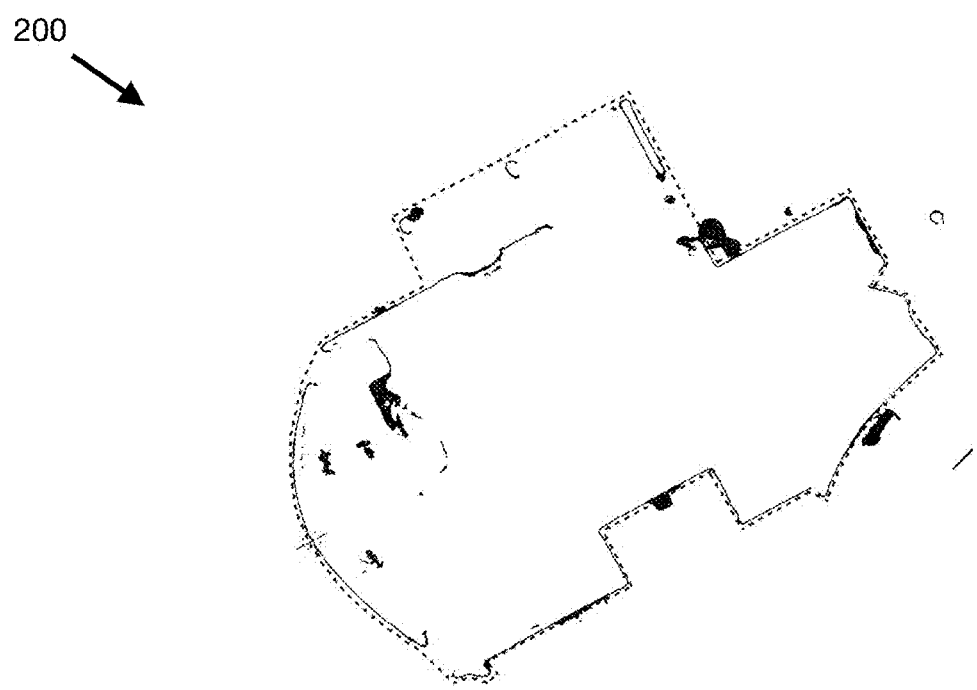
FIG. 2 illustrates an example of the imperfect floor plan scan of FIG. 1 that has had a more accurate floor plan extracted.

Disclosed below are representative embodiments of methods, non-transient machine-readable media, and systems having particular applicability to systems and methods for creating better floorplans from imperfect floorplan scans. Described embodiments implement one or more of the described technologies.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "One embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

For convenience, the present disclosure may be described using relative terms including, for example, left, right, top, bottom, front, back, upper, lower, up, and down, as well as others. It is to be understood that these terms are merely used for illustrative purposes and are not meant to be limiting in any manner.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may be referred to as a "system." Furthermore, the present embodiments may take the form of a computer program product embodied in any tangible medium of expression having computer-usable program code embodied in the medium.

Any combination of one or more machine-usable or machine-readable media may be utilized. For example, a machine-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, or a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a machine-readable medium that can direct a computer or other programmable data processing apparatus to function in a particular manner, such that the instructions stored in the machine-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as creating floor-plans from 3-D point clouds using much more efficient computing techniques which use much less processing power and much less computer time. Other advantages based on the technical characteristics of the teachings will also be apparent to one of skill from the description provided.

I. Overview

A rough floor plan may be created by using floor plan detection such as augmented Reality AR/LiDAR (Augmented Reality/Light Detection And Ranging) which allows capture of a detailed cloud of 3-D points, with reasonable accuracy and precision, in real-time, by walking through a building and surveying the area with a camera/depth scanner device. This cloud of 3-D points may be automatically structured to create a 3-D mesh. A set of 2D line segments summarizing the key structures and shape of the mesh can be extracted as described in patent application Ser. No. 17/459,084, filed on Sep. 15, 2021, hereby incorporated by reference herein in full for all purposes. With reference to FIG. 1 at 100, even the best LiDAR representations often include small errors. According to various embodiments, a 3-D point cloud, or 3-D mesh, of an environment is captured using a depth measuring system, such as LiDAR, simultaneously with the same environment being captured in a 2-D Artificial Reality (AR) environment. Various embodiments then use a combination of user inputs and machine learning to place annotations on the AR environment. These annotations are placed using 2-D coordinates from the 3-D LiDAR system. Looking at FIG. 1, it may appear that closest neighbor lines could just be intersected, but the problem may be much more computationally challenging. The goal is to draw a set of paths that describes the outline of each room. To do so, a path through the graph that visits each vertex exactly once must be determined. However, this is known as the Hamiltonian path problem and is NP-Complete. A closely related problem that might be used to determine the floor plan is the "longest path in a graph problem." Although this approach may avoid shortcuts, and theoretically take less time, it is still NP-Hard. Thus, neither method will create a connected floor plan in any sort of reasonable time that could be possibly used.

Since a theoretical result is not currently practically computable, various embodiments disclosed here describe systems and methods to improve an imperfect floorplan scan. The floor plan is built up wall by wall using a user-held LiDAR device with a display screen. The user scans the room, and puts marks on the display screen that show wall locations. As a new wall is determined by the user mark, LiDAR calculations, and the heuristic, the user is given a look at the current floor plan. When the floor plan shows an error, the user may place another mark to more exactly specify a wall location. This makes creating the floor plan possible, when before, the calculations required too much computer power and too much time to effectively perform. There is another solution to this problem where user drops a pin at each corner of a room, however the pin annotations must be placed in order as one goes around the room. It's like trying to wrap a string or ribbon around the room; if a pin is missed, the process must be started over from the beginning.

A distinct advantage of our approach is that the user can place markings in any order. If they are given feedback to show the previous placement was insufficient, the just add more. This is much more interactive whereas the "pin dropping" requires quite a bit of prior planning.

FIG. 3 illustrates a generalized example of a suitable machine environment 300 in which described embodiments may be implemented. The machine environment 300 is not intended to suggest any limitation as to scope of use or functionality of the disclosure, as the present disclosure may be implemented in diverse general-purpose or special-purpose machine environments.

With reference to FIG. 3, the core processing is indicated by the core processing 330 box. The machine environment 300 includes at least one central processing unit 310, a GPU 315, and memory 320. The central processing unit 310 executes machine-executable instructions and may be a real or a virtual processor. The memory 320 may be volatile memory (e.g., registers, cache, RAM), non-volatile memory (e.g., ROM, EEPROM, flash memory, etc.), or some combination of the two. The memory 320 stores software 385 implementing the described methods of extracting floor plans from imperfect floor plan scans.

A machine environment may have additional features. For example, the machine environment 300 includes storage 340 and communication connections 370, which may include one or more input/output devices 350, one or more network connections (e.g., wired, wireless, etc.) 360 as well as other communication connections (not shown). Communication connections 370 may include one or more wireless transceivers for performing wireless communication and/or one or more communication ports for performing wired communication. In embodiments, communication device 370 may be configured to receive captured building features using 2D and 3D sensors. The input/output devices may comprise a two-dimensional camera 352. A depth sensor 354, such as a LiDAR (Light Detection And Ranging) system may also be included, as well as a touchscreen 356, which allows users to enter information, and for pictorial information, etc., to be displayed. An interconnection mechanism (not shown) such as a bus, controller, or network interconnects the components of the machine environment 300. Typically, operating system software (not shown) provides an operating environment for other software executing in the machine environment 300, and coordinates activities of the components of the machine environment 300. A computing system within the machine environment may also be distributed; running portions of the software 385 on different CPUs. For example, in some embodiments, portions of the software 385 may run on a device colocated with the depth sensor 354 or touchscreen 356 while other portions of the software may run on a separate server or virtual machine (not shown) accessible via the network connections 360.

The storage 340 may be removable or non-removable, and includes magnetic disks, magnetic tapes or cassettes, CD-ROMs, CD-RWs, DVDs, flash drives, or any other medium which can be used to store information and which can be accessed within the machine environment 300. The storage 340 stores instructions for the software, such as region of interest detection software 385 to implement methods of extracting floor plans from imperfect floor plan scans.

The input device(s) 350 may be a device that allows a user or another device to communicate with the machine environment 300, such as a touch input device such as a keyboard, a camera 352, a depth measurement system 354 such as a LIDAR system, a microphone, mouse, pen, or trackball, a scanning device, a touchscreen 356, or another device that provides input to the machine environment 300. For audio, the input device(s) 350 may be a sound card or similar device that accepts audio input in analog or digital form, or a CD-ROM reader that provides audio samples to the machine environment. The output device(s) 350 may be a touchscreen, display, printer, speaker, CD-writer, or another device that provides output from the machine environment 300. A Compass/Magnometer 390 may be included which may allow the device to determine which direction pictures are taken with the camera 352 and Depth Sensor 354.

The communication connection(s) 370 enable communication over a communication medium to another computing/machine entity. The communication medium conveys information such as machine-executable instructions, compressed graphics information, or other data in a modulated data signal. Communication connections 370 may comprise input/output devices 350, and input/output devices that allows a client device to communicate with another device over network 360. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 360 may be a combination of multiple different kinds of wired or wireless networks. The network 360 may be a distributed network, with multiple computers, which might be building controllers acting in tandem. A computing connection 370 may be a portable communications device such as a wireless handheld device, a cell phone device, and so on.

Machine-readable media are any available non-transient tangible media that can be accessed within a machine environment. By way of example, and not limitation, with the machine environment 300, machine-readable media include memory 320, storage 340, communication media, and combinations of any of the above. Machine-readable storage media 365 which may be used to store instructions 375 and data 380. Data sources may be computing devices, such as general hardware platform servers configured to receive and transmit information over the communications connections 370. The machine environment 300 may be an electrical controller that is directly connected to various resources, such as HVAC resources, and which has CPU 310, a GPU 315, Memory 320, input devices 350, communication connections 370, and/or other features shown in the machine environment 300. The machine environment 300 may be a series of distributed computers. These distributed computers may comprise a series of connected electrical controllers.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible machine-readable media (e.g., tangible machine-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

FIGS. 4A at 400A and 4B at 400B illustrate examples of the back and front of an example user device with a depth scanner and a camera. Systems and methods as described herein may be implemented using a mobile phone 400A, another portable computing device, or a computing device with a 2-D camera 405A and a depth scanner 410A. In some embodiments, the system includes a user input device. This user input/output device may be a touchscreen 405B. The user input device may be associated with a different device than the one that houses the depth scanner and the camera.

To capture a space, in some embodiments, a user walks around pointing a device with both a camera and a depth scanner (e.g., FIG. 4A, 4B) at areas within the space, from multiple perspectives. A 3-D cloud scan may be created by using a LiDAR depth scanner. Augmented Reality AR/LiDAR (Augmented Reality/Light Detection And Ranging) allows capture of a detailed cloud of 3-D points, with reasonable accuracy and precision, in real-time, as someone walks through a building and surveying the area with the 2-D/3-D scanner. This cloud of 3-D points may be automatically structured, to a certain extent, to create a 3-D mesh. However, a representative LiDAR mesh appears as unstructured "triangle soup" with a lot of noise and artifacts making it very difficult to discern the important aspects of the scene, such as a wall from furniture, appliances, and other material present. Furthermore, the amount of raw detail makes it difficult to extract regions of interest such as walls, windows, doors, etc. For example buildings contain many flat "wall-like" surfaces which are not walls, such as cupboards, bookshelves, desks, etc., making it difficult to determine a geometric criteria for designating a wall from things that are not a wall. The definition of these features heavily depends on context.

Figure 5:
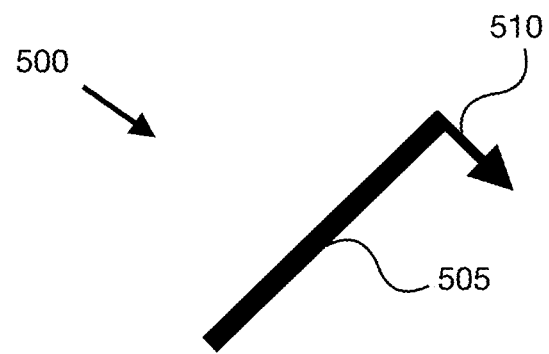
FIG. 5 illustrates an example of a 2-D line segment with position and direction/orientation.

FIG. 5 at 500 illustrates an example of a 2-D line segment 505 with an orientation (direction) 510 that is used to create optimized floor plans. Here the orientation is at one end, but the orientation may be anywhere along the line segment. One way to create an imperfect floor scan is to capture the 3-D environment, while intelligently detecting features which are not part of the floor plan. A 3-D point cloud, or 3-D mesh of the environment, may be captured using a depth measuring system, such as LiDAR, simultaneously with the same environment being captured in a 2-D Artificial Reality (AR) environment. The two dimensional capture from the camera presents a representation of the 3-D depth geometry, using a transformation of two dimensions of the three dimensional grid. The transformation may be provided by software associated with the camera, the depth scanner, or both. This scan includes relevant reading from sensors including orientation and compass direction. A user may place annotations on a display in an area indicating a wall, the indication in 2-D. A pre-trained machine learning algorithm may then be used to place the annotation made by the user within the 3-D mesh environment. The annotations act as hints to identify the general location of features the user cares about, such as, in this case, walls. The placement of the annotations may not indicate exactly where a feature is located; rather they may suggest general areas to look for in the 3-D mesh to find the feature of interest. Once the 3-D mesh has been completed, in both real-time preview and in a post-processing step, the 2-D annotations are transformed into specific locations in the 3-D space, locating the 2-D annotation and the orientation. The transformation may comprise, in part, averaging the locations in 3-D space, averaging the locations in 2-D space, or a combination of the two. In some instances, the placement is delayed until post-processing, which allows significant improvements in accuracy and consistency. The area around the 3-D scan annotation, which may be mesh faces within a 3-D mesh, is checked for mesh faces with a similar orientation to the mesh face at the 3-D scan annotation. These mesh faces may be adjacent mesh faces. When an adjacent mesh face with a similar orientation is discovered, adjacent faces to this discovered mesh face may be checked, and so on. These mesh faces with a similar orientation are then marked as a portion of the region of interest. Once a portion of the region of interest has been discovered, this may be determined to be a wall floor plan portion. This wall floor plan portion may be flattened into a 2-D marker 500 by flattening the marker such that the flattened portion runs parallel to the floor. An imperfect floor plan, such as that shown in FIG. 1 may be calculated by the compass and other orientations automatically determined by the 2-D camera and LiDAR created 3-D scan.

Figure 6:
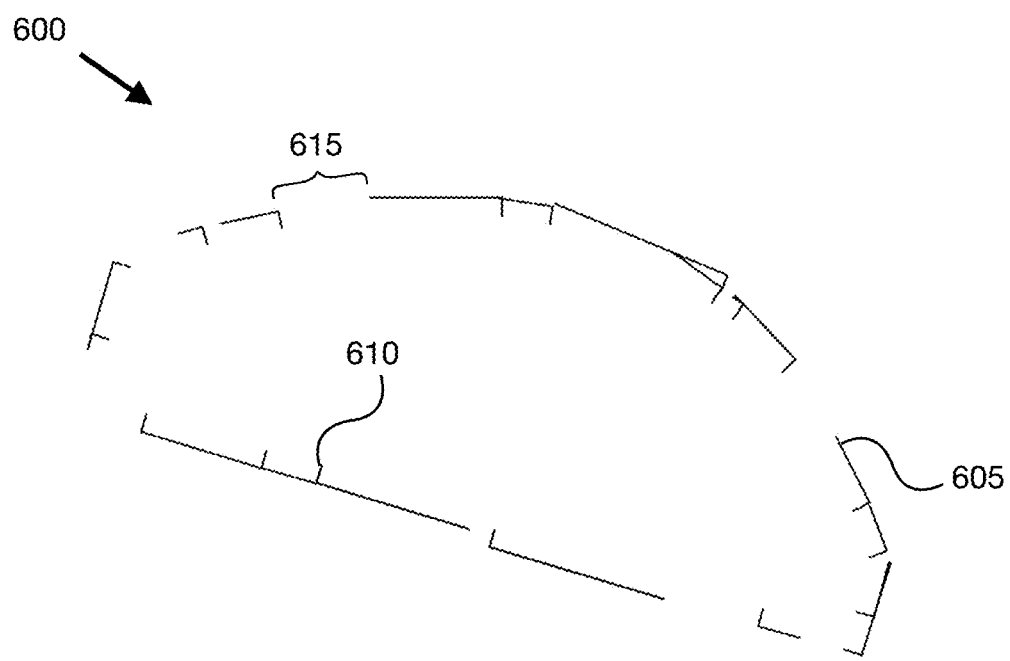
FIG. 6 illustrates an example of an imperfect floor scan made out of 2-dimensional line segments.

Such a system of creating an imperfect floor plan and locating annotations is disclosed in U.S. patent application Ser. No. 17/459,084, filed on Sep. 15, 2021, and which is hereby incorporated by reference in its entirety for all purposes. FIG. 6 at 600 illustrates an example of a graphical representation of a set of known 2-dimensional segments 605 with position and orientation 610 that might describe an imperfect floor plan such as used herein. The imperfect floor plan contains gaps 615 that should be closed to create a more useable floor plan.

II. Embodiments

Figure 7:
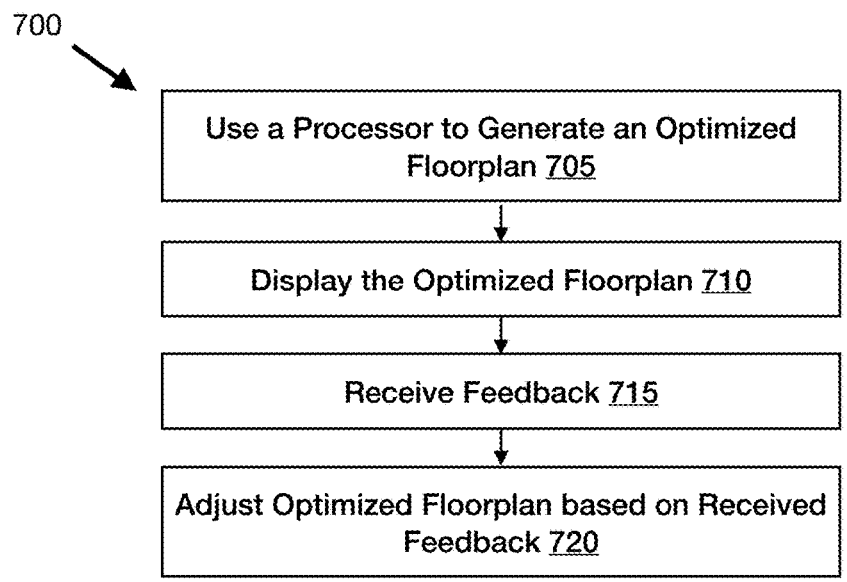
FIG. 7 illustrates an example of a method for extracting an optimized floor plan from an imperfect floor plan according to certain described embodiments.

With reference to FIG. 7, a flow chart 700 describes a method that may be used by the device in embodiments disclosed herein. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiment, method 700 may be implemented by a program 385 stored in a processor and memory element 330, in one or more processing devices (e.g., a digital processor, an analog processor, a microprocessing unit, a digital circuit designed to process information, and/or mechanisms for electronically processing information), such as in the core processing element, which includes a central processing unit 310 and memory element 320. The one or more processing devices may include one or more devices executing some or all of the operations of methods disclosed herein in response to instructions stored electronically on an electronic storage medium. The one or more processing devices may include one or more devices configured through hardware, firmware, and/or software to be specifically designed for execution of one or more of the operations of methods and systems described herein. Operation 705 discloses using a processor to generate an optimized floorplan using methods and systems disclosed herein. Operation 710 discloses displaying the optimized floor plan. This display may be on a LiDAR enabled device, e.g., 400B, a device 356 associated with the computing environment, which may or may not be a touchscreen device, or a different device.

Figure 8:
FIG. 8 illustrates an example of a display that may be found on the display screen of a depth scanner/camera device showing the optimized floor plan.

FIG. 8 discloses a display that may be found on the display screen of a depth scanner/camera device or a different sort of computer with a display screen. This display may be a background of a portion of a structure being scanned, such as seen through a viewfinder, such as the room portions shown in FIG. 8 at 800. The display may also show a mark 805 made by a user on the display screen marking a wall that was used previously to develop the optimized floor plan 810. For example, the user may drag their finger or a stylus across the screen, leaving a colored mark 805 or other indication of the shape traced thereby. In some embodiments, the mark 805 may be associated in three-dimensional space with the location of the surface over which the mark 805 was drawn. Thereafter, as the location of the camera device (e.g., camera 352) changes and the view on the display of the marked surface changes, the image of the mark 805 may similarly be transformed in, for example, translation, rotation, scale, skew, etc., such that the mark 805 remains displayed on the surface as marked when that surface remains visible on the display.

The optimized floor plan may not be the best possible optimization, as shown at in an example preview panel 810, where the in progress floor plan appears to be two triangular rooms, which appears to be a mistake as at this point three walls of a single room have been scanned (the first two walls and their deliberate marks not shown). So, ideally, the floor plan should show a single triangle, as the fourth wall has yet to be scanned. The two triangles shown indicate that another deliberate mark should be made to give more information to more accurately determine the floorplan. In embodiments, the display may also show the direction that the particular picture was taken or that the camera device is oriented with respect to the in-progress floor plan when the view on display 800 is a live augmented reality view of the space being mapped. This is shown by the circular arc 815; the vertex shows the position of the user and the arc shows the camera's field of view. This allows a user to position themselves in space to determine how accurate the more-optimized floor plan display 810 is.

Figure 9:
FIG. 9 illustrates an example of a display that may be found on the display screen of a depth scanner/camera device showing the optimized floor plan.

At operation 715, the processor receives feedback about the more-optimized floor plan. A user looking at the more-optimized floor plan, e.g., 810 may notice that the floor plan is not correct, and so may make another deliberate mark, e.g., to give more feedback to the floor plan extraction program. FIG. 9 at 900 illustrates an example that shows another view of the same wall shown in FIG. 8, but with the depth scanner moved to show a further portion previously not within view. A user may then place another deliberate mark 905 on the display. The device (or a processor connected through a wired or wireless connection to the device) may then process the information received to determine a new floor plan line segment that can then be used to determine the floor plan more accurately. In some embodiments, to turn the deliberate mark into a line segment, a plurality of depth measurements captured by the depth sensor may be obtained. These depth measurements may be obtained from a program that is associated with depth measurement capture. The depth measurements define distances from the depth sensor to respective points in the space using a three dimensional grid.

The deliberate mark (which is initially created in two dimensions) may be mapped onto the three dimensional grid using the depth measurements to make a three dimensional ray. Two dimensions may be detected in a two dimensional grid (associated with the display) which may then be transformed into the three dimensional mesh grid locations using software available with the 3-D mesh system, the 2-D camera system, some combination, etc. For the detected points within the deliberate mark, for at least some of the points, the two dimensions of the point are then transformed into a ray with a third dimension tail that intersects the three dimensional shape that the region of interest is attached to. The ray is then followed to see where it hits a mesh within the 3-D world, creating a 3-D ray where the point of the ray intersects with the wall. Multiple 3-D rays along the deliberate mark may then be averaged at their along their ray points to determine a flattened 2-D directed line segment. When this 2-D line segment, e.g., the feedback, has been placed in such a manner that the processor can understand, at operation 720, the more-optimized floor plan is adjusted using the feedback. This optimization 910 may then be shown on the display 900. In some instances, the optimization may be shown within a definite area 915 within the display. Here, the definite area 915 is delineated by a dotted line. Other definite areas and delineations are also within the range of this disclosure. When shown, if the more-optimized feedback 910 is still incorrect, the user may place another deliberate mark until the floor plan appears correct.

Figure 10A:
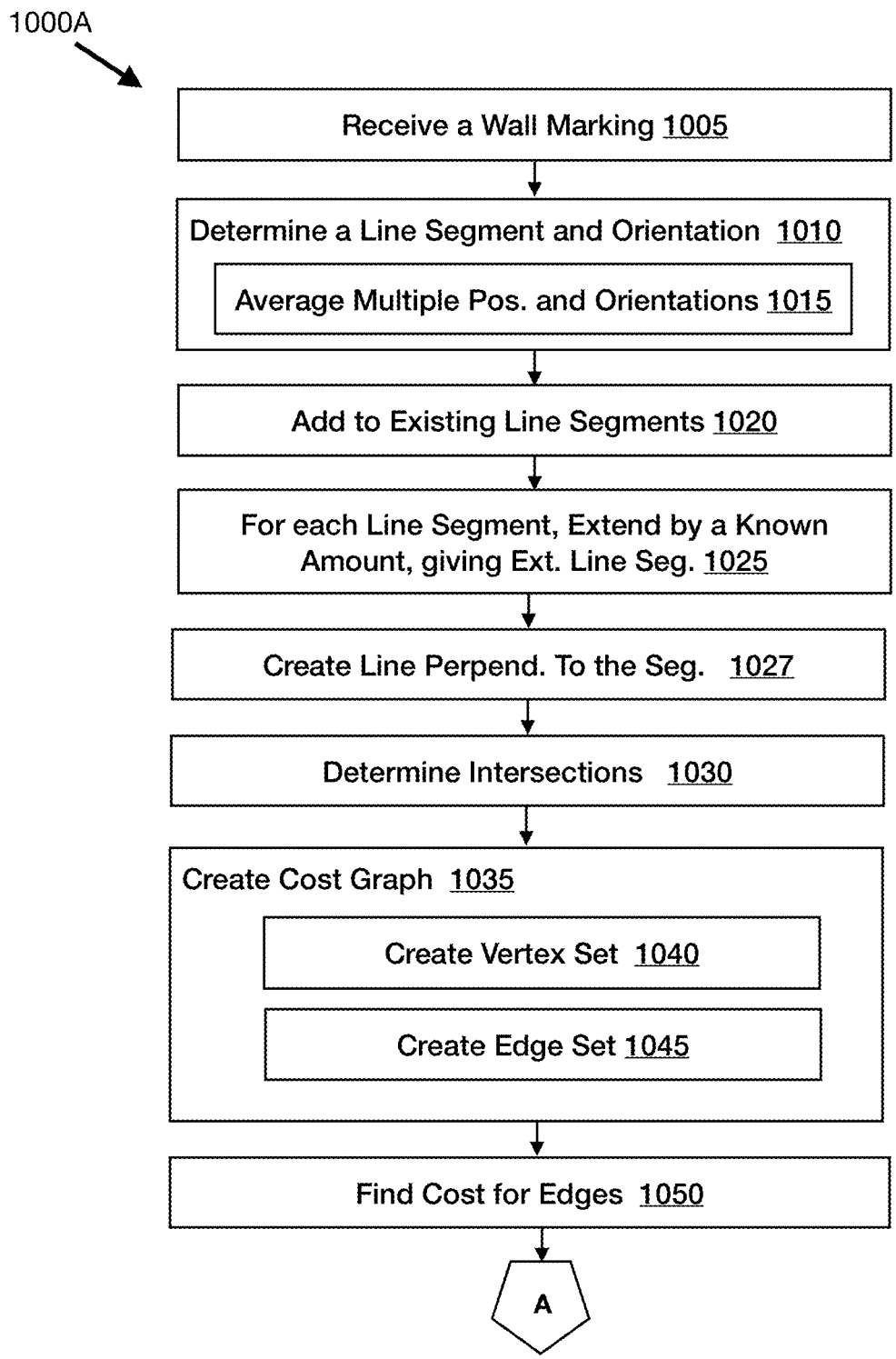
FIGS. 10A and 10B illustrate examples of a flowchart that describes receiving feedback and adjusting the optimized floor plan based on the feedback.
Figure 11:
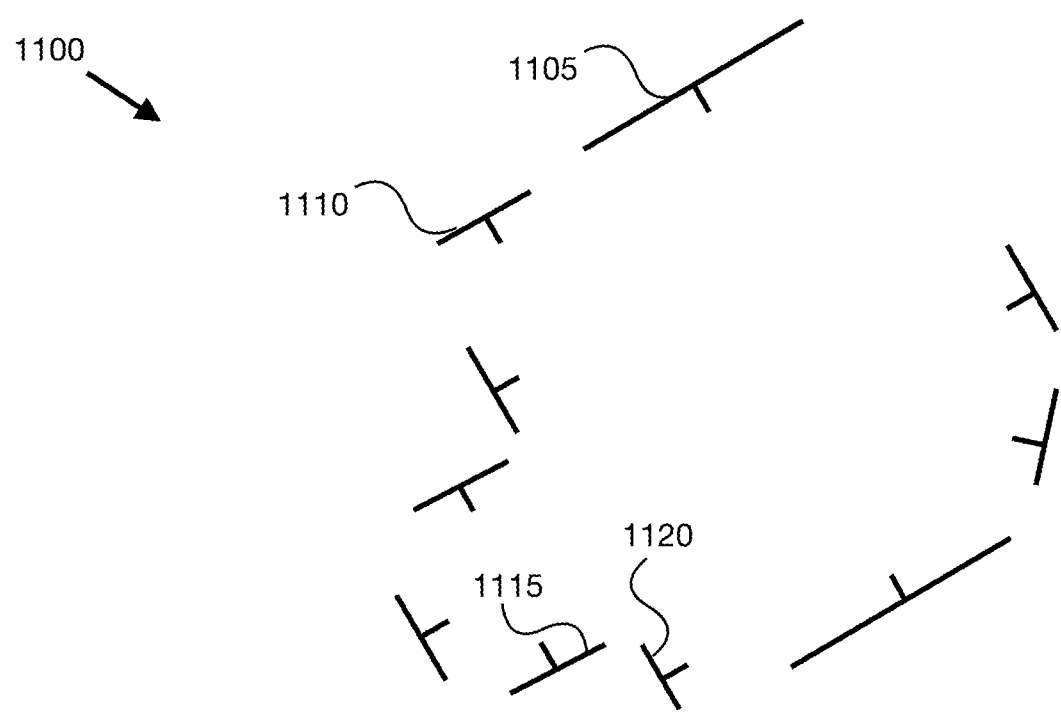
FIG. 11 illustrates an example of known line segments in graphical form that can be connected to form a floor plan.
Figure 12:
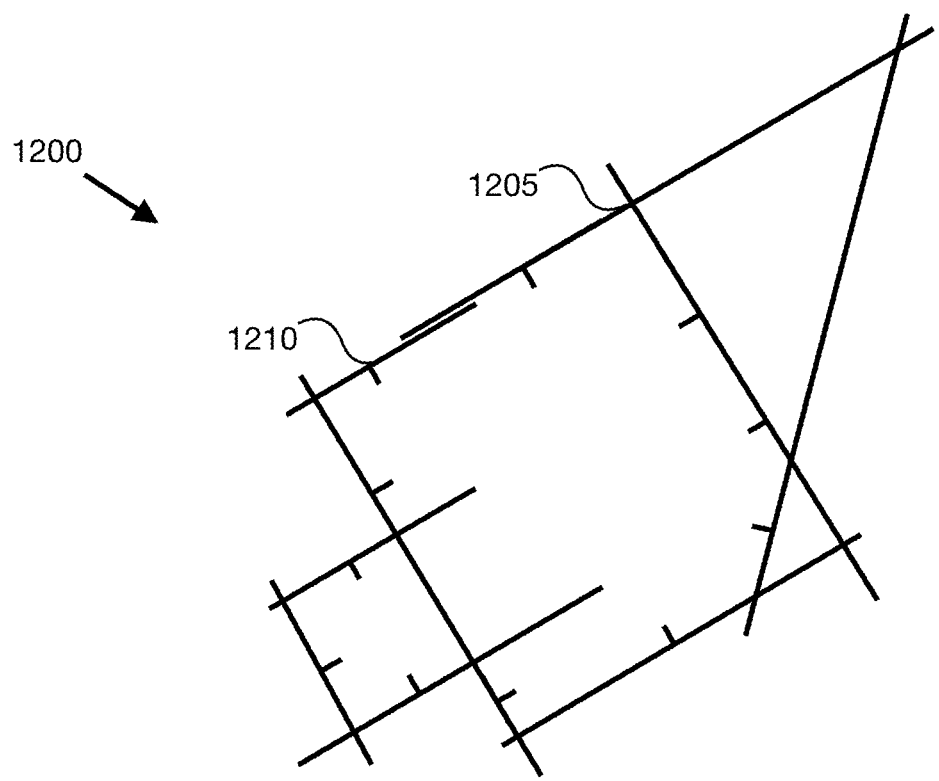
FIG. 12 illustrates an example of the line segments of FIG. 11 being extended some amounts.

FIGS. 10A at 1000A and 10B at 1000B illustrate examples of a flowchart that describes, in more detail, receiving feedback and adjusting the more-optimized floor plan based on the feedback. At operation 1005, a wall marking is received. Receiving wall markings is discussed with reference to FIG. 8 and FIG. 9 and the surrounding text. At operation 1010, a line segment and orientation is determined. Determining the new line segment may comprise averaging multiple positions and orientations 1015. These line segments represent parts of walls in incomplete portions of a floor plan. Line orientations are associated with line segments and point in to the middle of a presumed room. These are described in more detail with reference to FIGS. 5 and 6 and the surrounding text. At operation 1020, this new line segment is added to the known line segments. FIG. 11 at 1100 illustrates an example of known line segments in graphical form that can be connected to form a floor plan. A single line segment, with orientation, is shown at 1110. This line segment may have been added as the line segment 1105 along with other line segments may have produced a non-optimal floorplan, such as that shown at 810. At operation 1025, each line segment is extended by some amount, creating an extended line segment. For example, the line segments may be extended by a fixed amount, by an amount within a range, different segments may be extended by different amounts, or another method may be used. In some cases, a threshold amount may be set which defines the maximum amount that a line can be extended. FIG. 12 at 1200 illustrates an example of the line segments of FIG. 11 being extended some amounts. At operation 1020, these extended line segments are added to a set of extended line segments.

Figure 13:
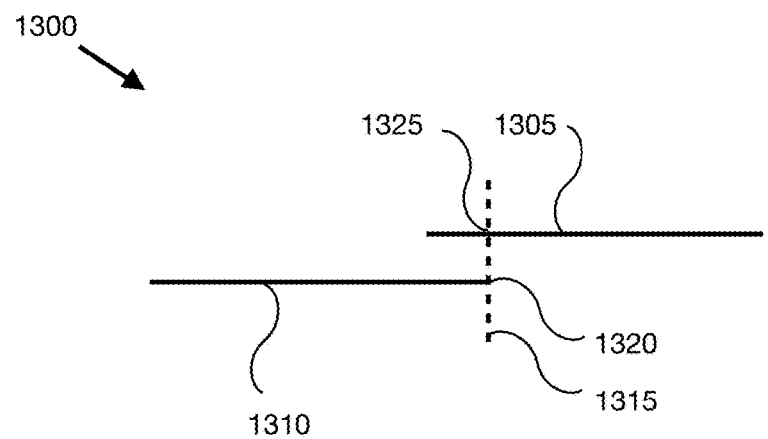
FIG. 13 at 1300 illustrates an example of a perpendicular line drawn between two line segments.

This graph of extended line segments represents possible paths, but not all possible paths connecting line segments. Sometimes line segments are misplaced; for example, the original graph may have multiple line segments which should be joined to make a single line segment, but which are offset in error. An example of such line segments are shown in FIG. 11 with reference to segments 1105 and 1110. Those two offset segments represent the same wall. When these two lines are extended 1205, 1210, the two lines will run parallel. Other line segments which are offset may capture actual surfaces which contain pillars, narrow hallways, and the like. It is important to be able to tell the difference between an error and an actual architectural feature. To do so, at operation 1027, lines are created perpendicular to the line segments. These perpendicular lines may be created for each line segment, each extended line segment, or may be created as a subset of segments. The perpendicular lines may be created at an end of a line segment, in the middle, or in some other location. FIG. 13 at 1300 illustrates an example of such a perpendicular line intersecting another line segment. The line segment 1310 (e.g., line segment 1110, extended line segment 1210) has a perpendicular line 1315 created, at the right end 1320. The length of this perpendicular line 1315 may be a fixed length, may be dependent upon the length of the line segment 1310, may be a range of lengths, etc.

Figure 14:
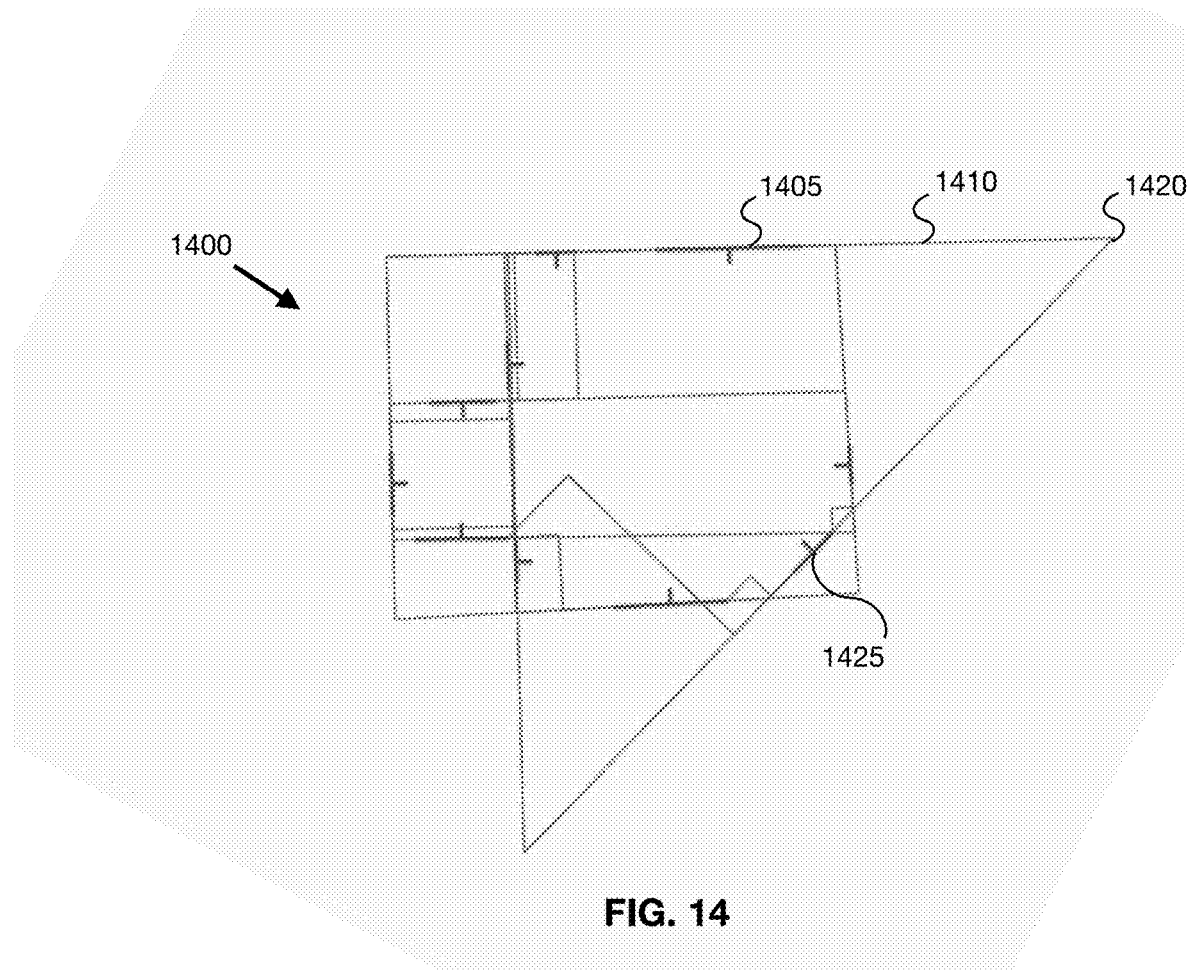
FIG. 14 illustrates an example of a graph that is a possible set of intersections through the line segments of FIG. 11.

At operation 1030, intersections (e.g., 1320, 1325) of these line segments with the extended segments 1305, 1310 are then found. To do so, a sweep line algorithm may be used, such as the Shamos-Hoey algorithm, the Bentley-Ottmann algorithm, or a different algorithm. The intersections that are impossible wall intersections due to differences in orientation are deleted. FIG. 14 illustrates an example of a graph 1400 that is a possible set of intersections through the line segments of FIG. 11. This figure shows the original segments, e.g., 1405 and the extended segments, e.g., 1410; and with the graph of the extended sections, e.g., 1410, 1415 meeting at intersections, e.g., 1420.

Figure 15:
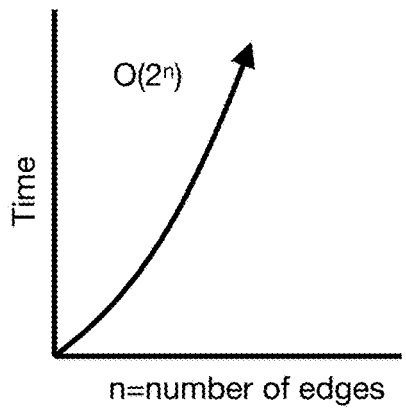
FIG. 15 illustrates a graph that describes exponential time.

The graph 1400 is now examined to find a good path through it. One outgoing and one incoming intersection should now be chosen for each segment to construct a floor plan from the line segments that matches the actual floor plan. The question is how to choose which segments will produce the floor plan. To do so, the method finds a path through the graph which visits each vertex (original line segment, e.g., 1405) exactly once. In other words, the approach aims to include each actual segment (e.g., those found in FIG. 11) with no shortcuts. This may give a loop which passes through all the actual segments. However, finding such a loop is a well known and very difficult problem to solve called a Hamiltonian cycle. Determining the existence of a cycle through the segments, even for graphs of restricted degree, is NP-complete. Another heuristic that may be used is the "longest in a graph" which is also NP-complete. The two theoretical solutions have hard exponential time complexity, in that the time to solve doubles for each added element, as illustrated by the graph in FIG. 15 at 1500.

Various embodiments disclosed herein utilize a heuristic that produces a solution in polynomial time. This is done by using the idea of "closeness" between line segments. This makes sense in the user experience as the user places markers close to each other because they expect them to be connected. The distance between line segments as well as the angles between chosen close line segments are both indicators that two line segments should be joined together. At operation 1035 a cost graph is created. This cost graph may comprise a vertex set 1040 and an edge set 1045. The vertex set may comprise a portion or all of the existing line segments (e.g., the original segments such as shown in FIG. 11). These existing line segments may be represented by a two dimensional point—the vertex. This point may be the line segment middle position, or a different position within the existing line segment. The edge set may comprise a possible intersection/joining relationship (e.g., 1420) between two of the segments represented in the graph using the extended segments and the lines perpendicular to the segments to find the intersections. The edge set values may comprise the actual intersection location between two extended segments, and the two vertices of the non-extended segments whose extensions created the intersection. Some embodiments may store the non-extended segments as part of the edge set, and so forth.

Figure 16:
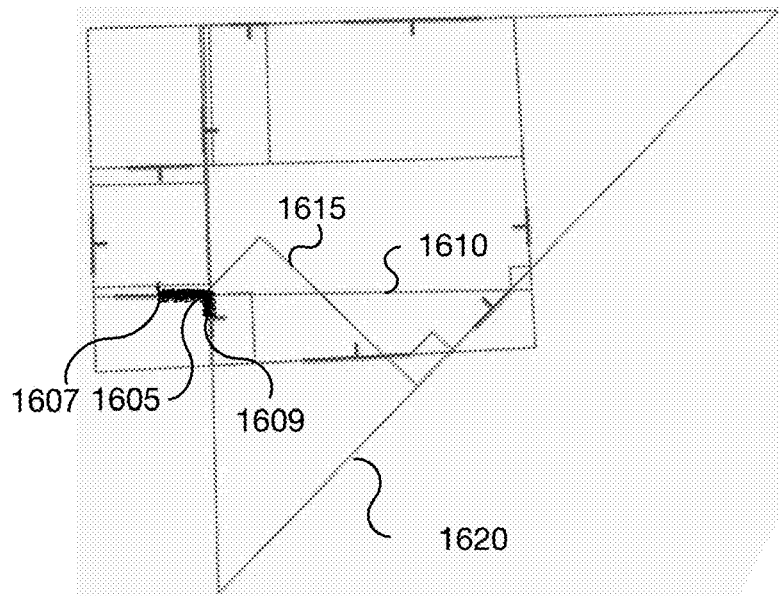
FIG. 16 illustrates an example of the edge with the lowest cost in FIG. 14 having being joined.
Figure 17:
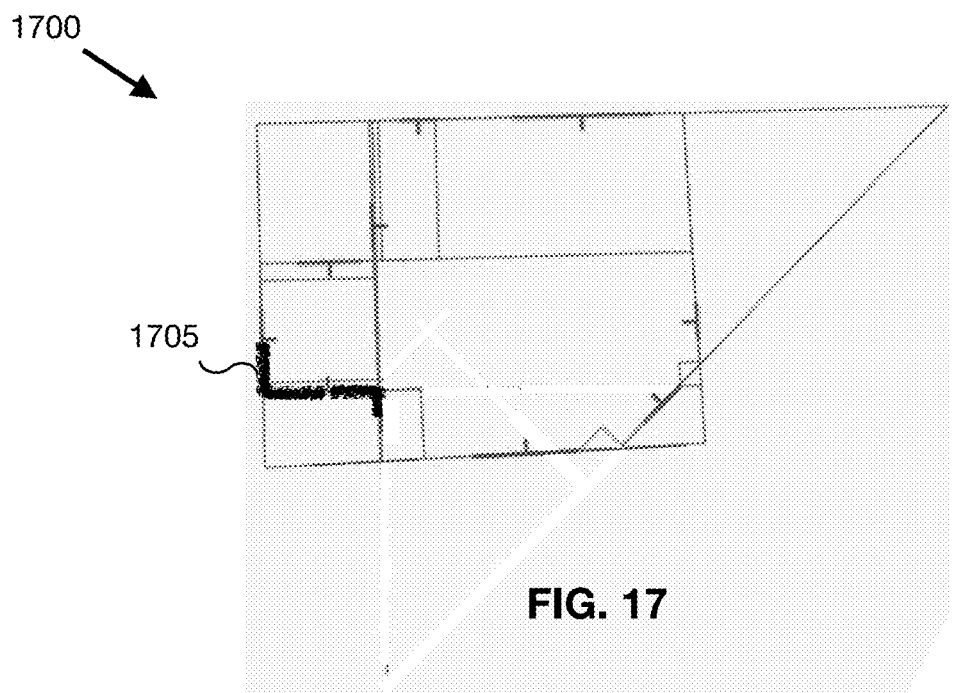
FIG. 17 illustrates the vertex-edge diagram of FIG. 16 after a second segment-intersection set has been chosen.
Figure 19:
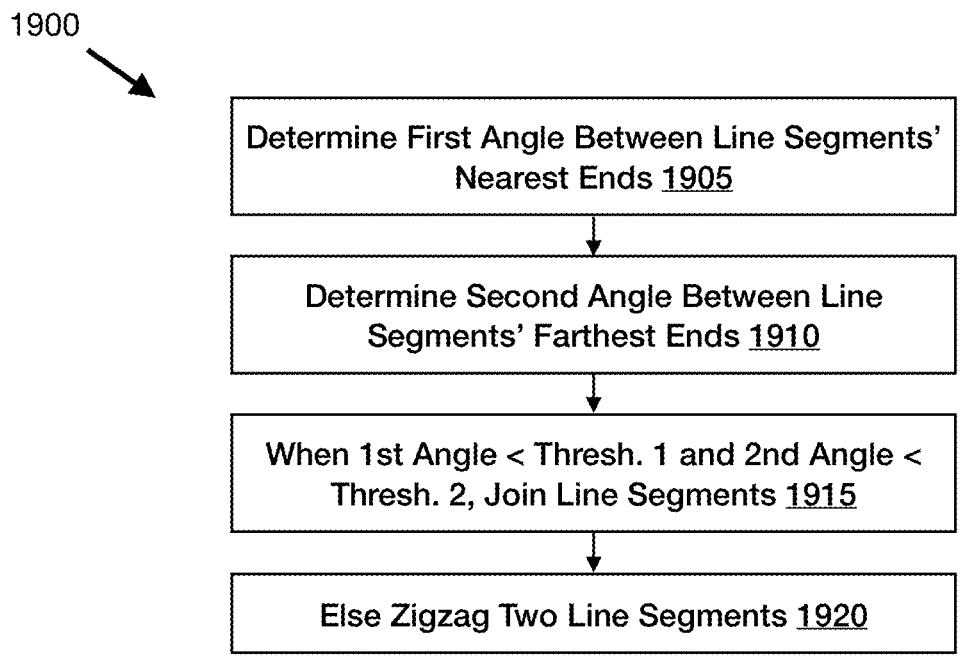
FIG. 19 illustrates an example of a flowchart that describes performing a join.

At operation 1050, the cost for the edges is found. The cost for an edge may be the length from a first vertex in the edge (e.g., 1405) to the second vertex (e.g., 1425) through the intersection point (e.g., 1420). The cost may include the vertical distance times a constant, the horizontal distance times a constant, and so on. The cost may be any combination of the above. At operation 1060, the edge with the lowest cost (e.g., the shortest length intersection segment) is determined. At operation 1065, the two segments (e.g. original segments 1115, 1120) with shortest length intersection are joined. FIG. 16 at 1600 illustrates an example of the edge with the lowest cost in FIG. 14 having being joined. In an example of a join, a line segment is created that runs from a point in one of the original line segments (in this example, the midpoint 1607) as represented in the chosen edge, through the intersection 1605 (represented in the chosen edge) to a point in the other line segment (represented in the chosen edge) 1609. FIG. 19 and the surrounding text discuss joining segments in more detail. At operation 1070, the joined segments are added to the more-optimized floor plan. At operation 1075, the edge and the appropriate end of the two vertices that are being joined are deleted from the graph, along with each edge that attaches to the joined end of the vertex (line segment). Examples of deleted edges when the given segments are joined are 1610, 1615, and 1620. FIG. 17 at 1700 illustrates the vertex-edge diagram after the second segment-intersection set 1705 has been chosen and the cost-graph segments with the same starting position as the edge with the lowest cost have been deleted.

At decision point 1080 it is determined if a loop has been created. If it has, then at operation 1090, the floorplan is displayed. If not, then at step 1085, if there are no vertices left in the cost graph, then at decision point 1087 then vertices that lead to dead ends are deleted. This is described in more detail with reference to FIGS. 25-29 and the surrounding text. Then, the floorplan is again built starting at operation 1060. In some embodiments, after displaying the floorplan at step 1090, the method may receive additional information from the user such as, for example, another deliberate 905 additional. In some embodiments, the method may receive modified scan data from the camera 352 or depth sensor 354 (e.g., a rescan after adding a new altering the environment by, for example, moving furniture or closing a door), etc. In some such embodiments, the method 1000A, 1000B may recompute the floor plan by, for example, looping back to step 1005.

Figure 18:
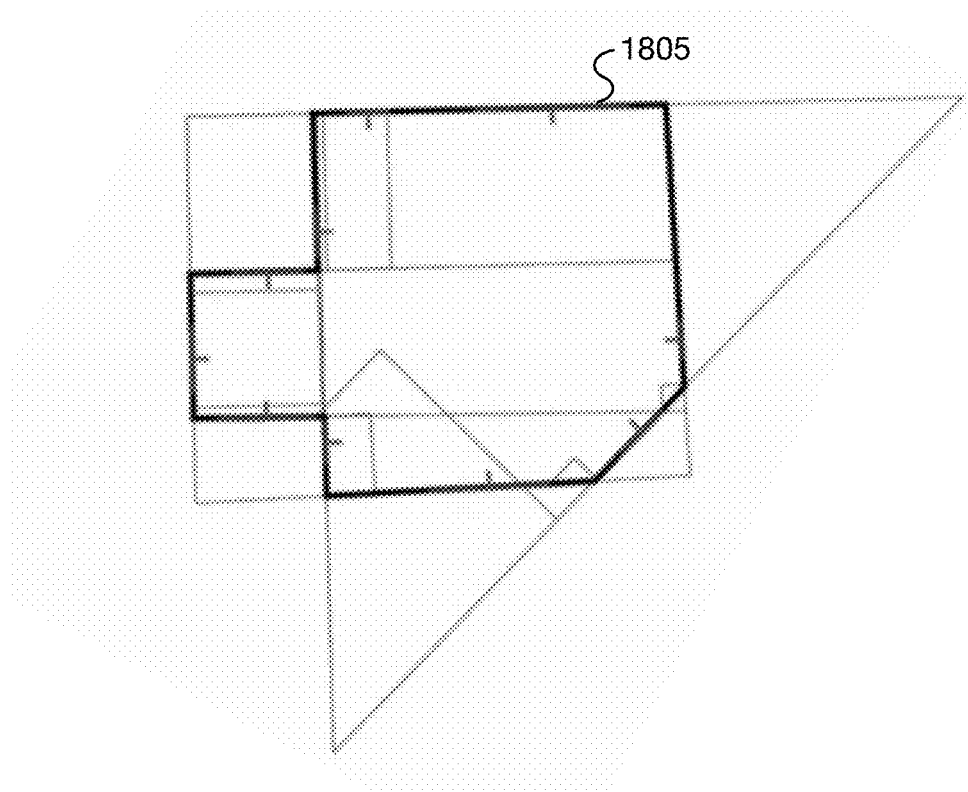
FIG. 18 illustrates the cost graph shown in FIG. 14 with the optimized floor plan outlined.

FIG. 18 at 1800 displays the cost graph shown in FIG. 14 with the more-optimized floor plan 1805 outlined. FIG. 9 at 910 shows a display of a floor plan after three walls have been scanned, and after it has been further optimized. At operation 1095, the floor plan constructed herein is used to make a decision that will change the nature of the space that the floor plan represents, and/or change the space in which the floor plan sits. Many changes are possible. Among these, some possible changes may be determining where sensors may be placed, then placing the sensors in the building; using the floor plan to determine the floorspace, using the floorspace to determine how much heating and cooling is needed, using the amount of heating and cooling needed to size the HVAC system that will be placed in the building, purchasing the HVAC system, and then installing the HVAC system in the building.

Figure 20:
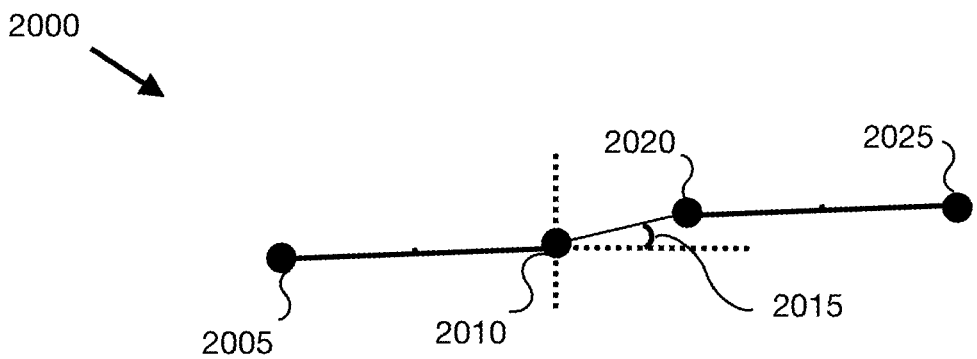
FIGS. 20-22 illustrate examples of performing a join using a straight line.
Figure 21:
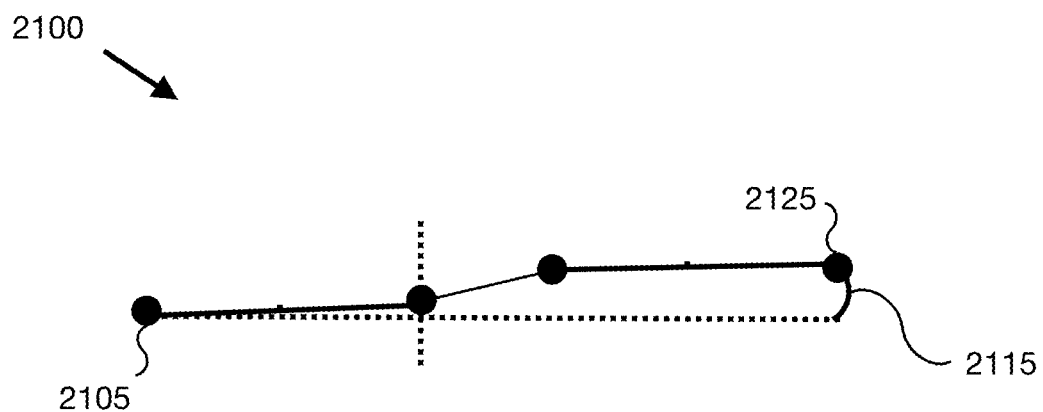
Figure 22:
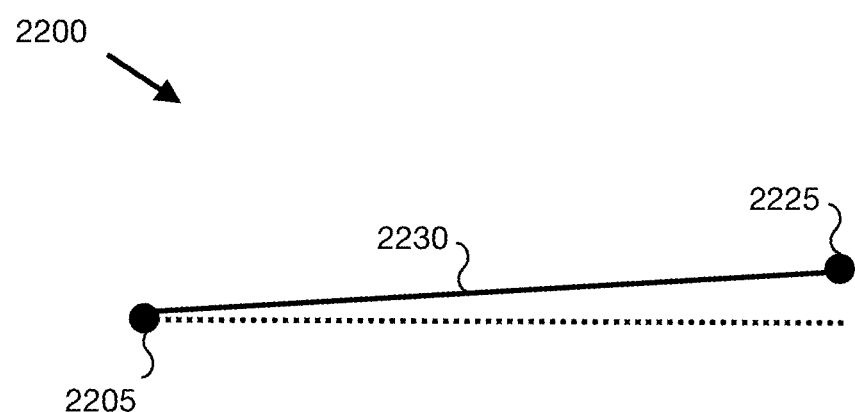

FIG. 19 at 1900 illustrates an example of a flowchart that describes, in more detail, performing a join (e.g., operation 1065) for one end of two joined segments. In some cases, two lines are to be joined that are offset from each other by a certain amount. In such cases, it may be decided if the lines are to be joined by assuming that the two lines should really be combined into a single line or if the lines are to be joined by making a zigzag corner. At operation 1905, a first angle is determined between the nearest ends of the two line segments to be joined. FIG. 20 at 2000 illustrates an example of taking a measurement of a first angle 2015 between nearest ends 2010, 2020 of two line segments (2005-2010 and 2020-2025) to be joined. At operation 1910, a second angle is determined between the line segments' farthest ends. FIG. 2100 illustrates an example of taking a measurement of a second angle 2115 between farthest ends 2105, 2125 of two line segments (2105-2110 and 2120 2125) to be joined. At operation 1915, it is determined if the line segments should be joined by turning them into a single straight line. They should be joined this way when the first angle is less than (or less than or equal to) a first threshold value, and when the second angle is less than (or less than or equal to) a second threshold value. The first angle threshold and second angle threshold may have a wide range of values. FIG. 22 at 2200 illustrates an example of joining two points by turning them into a single straight line by connecting the furthest point of the first segment 2205 with the furthest point of the second segment 2225 with a single straight line 2230.

Figure 23:
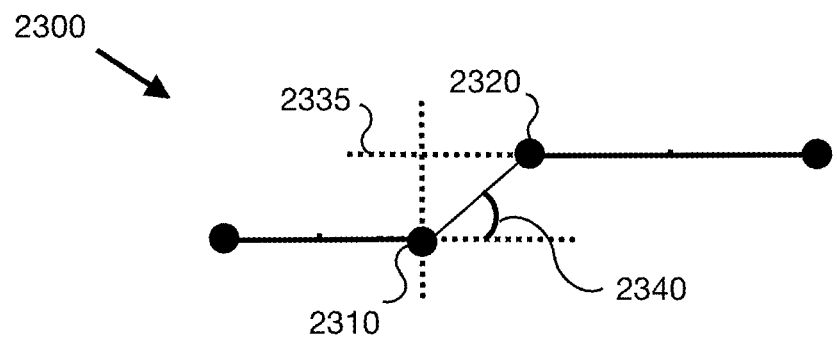
FIGS. 23 and 24 illustrate examples of performing a join using a zigzag.
Figure 24:
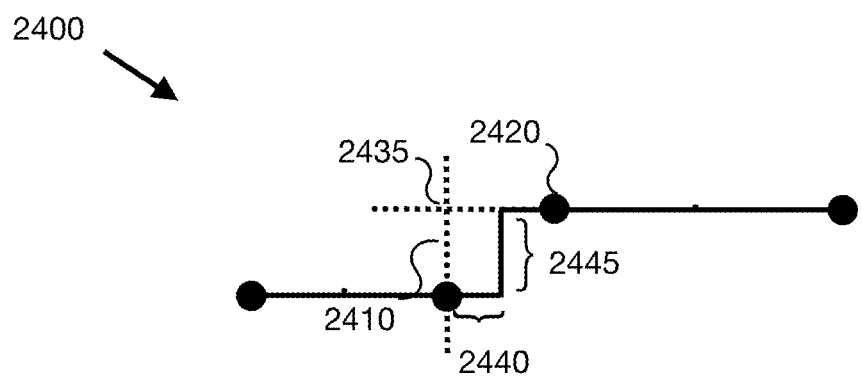

At operation 1920, the line segments are zigzagged. "Zig-zagging" relates to human ideas about knowing how buildings are constructed that they usually are constructed with square angles. The differences are very likely a small joint or pillar that was not fully described by the segments. With that in mind, in some implementations, a zigzag is chosen when the first angle (e.g., 2015) is above a threshold value or the second angle (e.g., 2115) is above a threshold value. As illustrated by the example given in FIG. 23 at 2300, the line segments' angle one is above a threshold value 2340. To zigzag a line, an x-y axis 2335 is created using the intersection of the two nearest end points 2310, and 2320. This x-y axis may meet at a 90 degrees angle, or another chosen angle. As illustrated by the example given at FIG. 24 at 2400, in the chosen broken axis, the line from the intersection of the x-y axis 2435 to one of the near end points 2420 is divided in half (or divided by some other percentage), then the zigzag between the two near points 2410, 2420 is drawn, with (Percentage) of the chosen broken axis line at one end 2440 and (100−percentage) of the chosen line drawn at the other end, with a line parallel to the non-chosen axis line 2445 drawn between them. Other methods may also be used to draw a line between the two noncontiguous points (e.g., 2410, 2420).

Figure 25:
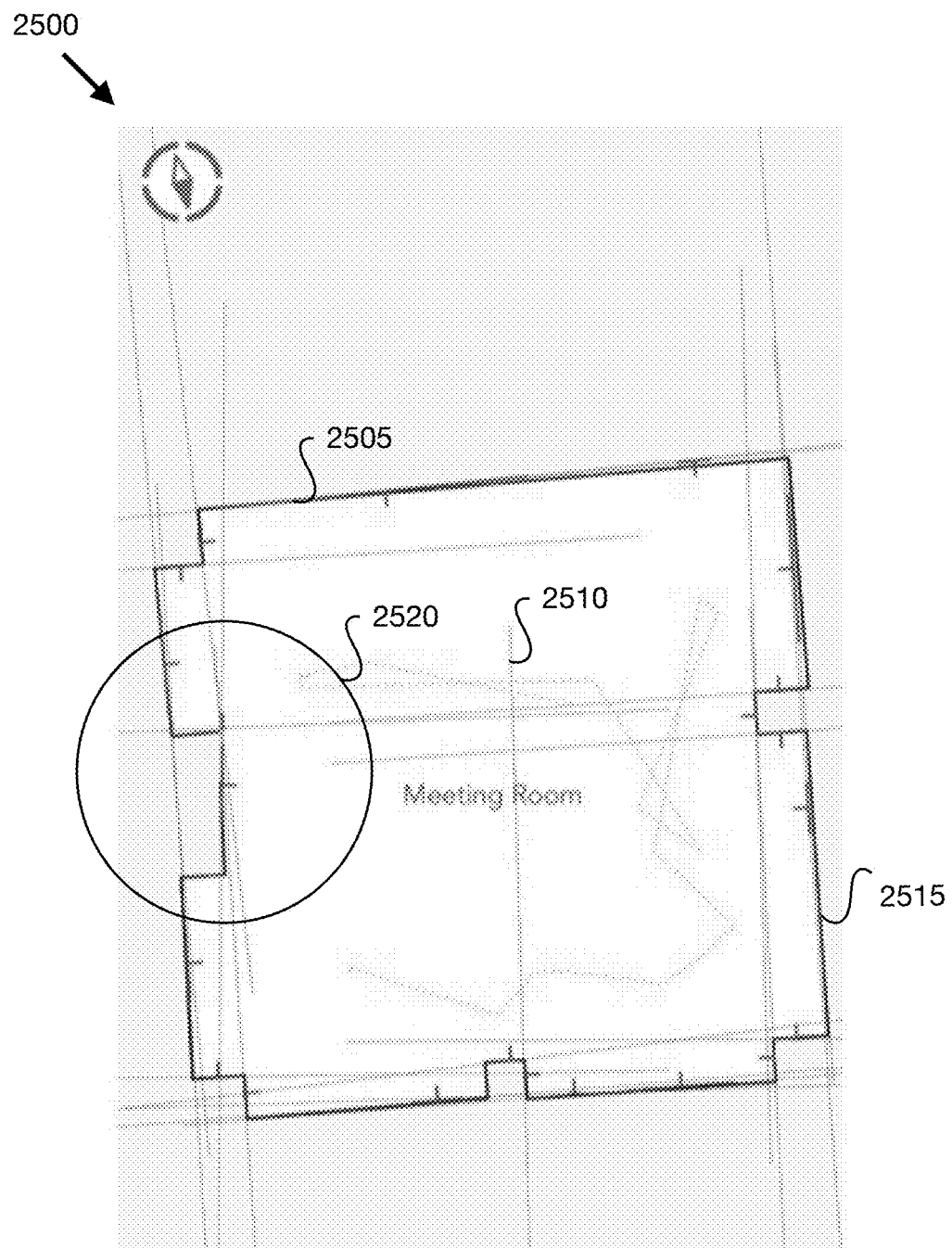
FIG. 25 illustrates an example of a floorplan that has failed to form a loop.
Figure 26:
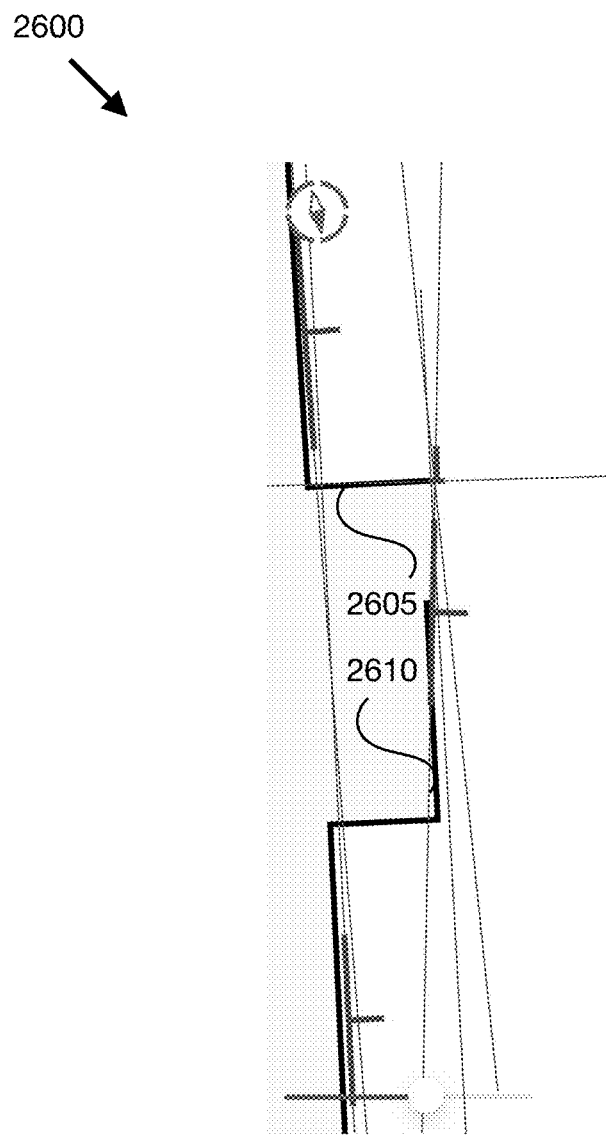
FIG. 26 illustrates an example of a floorplan portion that has failed to form a loop.
Figure 27:
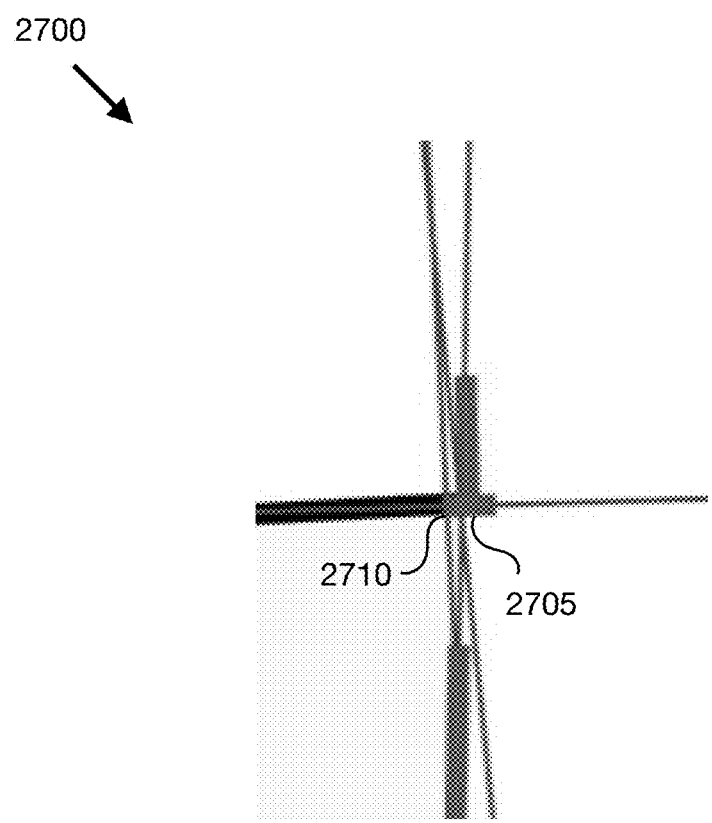
FIG. 27 illustrates an example of an intersection of a floorplan portion that has failed to form a loop.

In some instances, a floorplan scan fails to form a loop. FIG. 25 at 2500 illustrates an example of a floorplan 2515 with its original segments 2505 and extended segments 2510 that has failed to form a loop. Two closeups of the segments that did not join 2520 are illustrated in FIG. 26 at 2600 and FIG. 27 at 2700. The two markers 2605 and 2610 did not join because, as shown in the closeup of the intersection 2700, the marker 2705 is slightly on the wrong side of the intersection 2710.

Figure 10B:
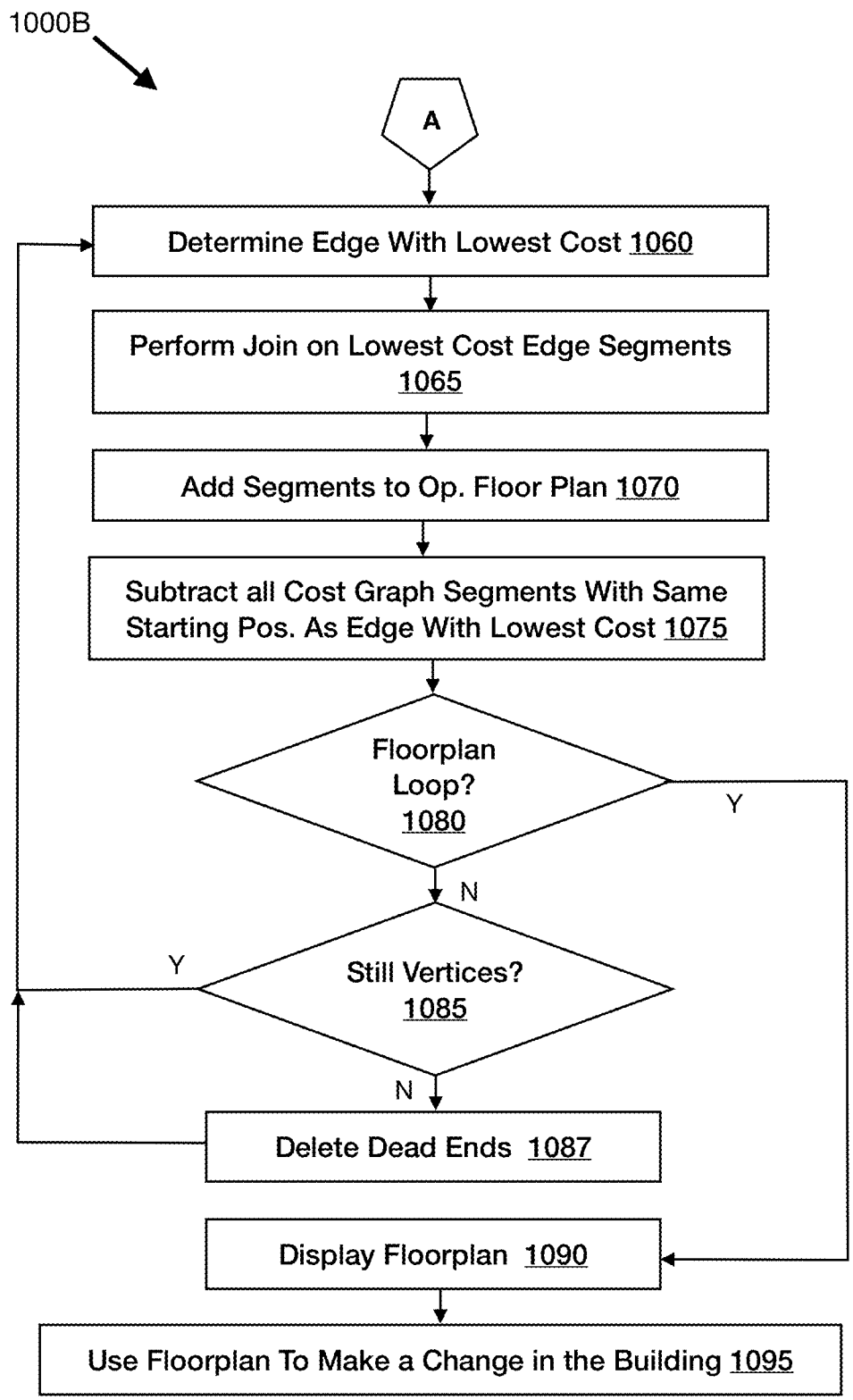
Figure 28:
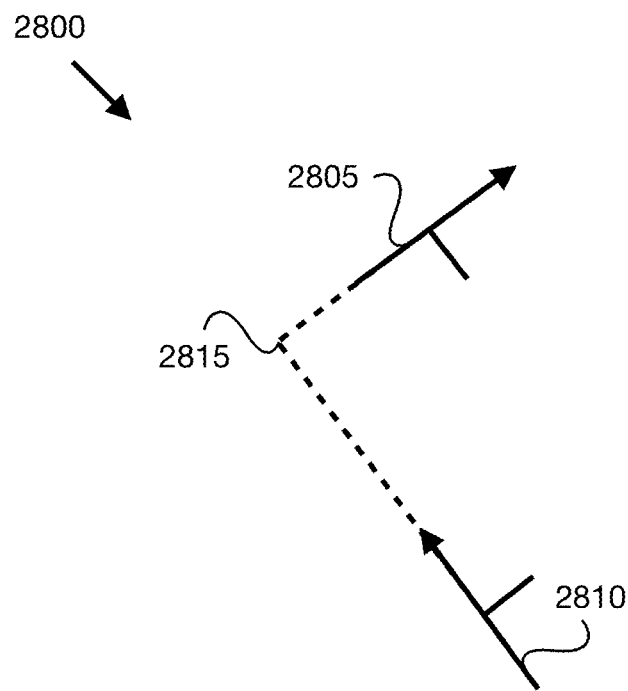
FIG. 28 illustrates an example of two segments that may join.
Figure 29:
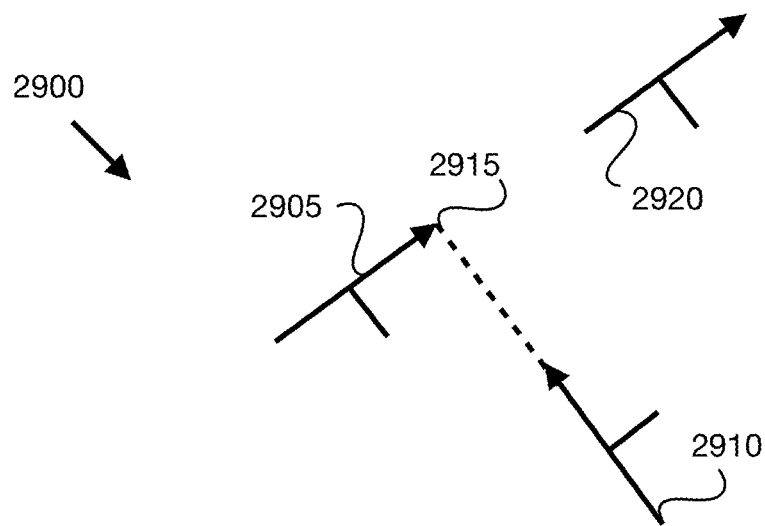
FIG. 29 illustrates an example of two segments that may not join.

To discuss the concept of what may join and what may not join, FIG. 28 at 2800 illustrates an example of two segments that have the possibility of joining. FIG. 29 at 2900 illustrates an example of two segments that may not join. In these two figures, the arrows on the segments are on the left with reference to the orientation. That is, they indicates what is "inside" a room. When a segment may intersect, an intersection point 2815 may be in front of one potentially intersecting segment 2810 and behind another potentially intersecting segment 2805. Segments may not potentially intersect when they are both in front of or behind the intersection point. Segments 2905 and 2910 are both behind the intersection point 2915. In such cases, the orientation between the two marks is different, so they cannot be joined. This can be visualized as the errant segment 2905 being outside the room, here defined by the segments 2920 and 2910. These segments that can only connect once leads to a dead end. As can be seen with reference to FIG. 27, the incorrect orientation just barely happened—one segment was just barely out of range to connect properly. These ever-so-slightly misplaced segments occur due to small errors that may accumulate. If this segment that can only connect on one side is deleted, then the proper segments that define the floorplan can be connected up, e.g., 2920. To fix this problem, with reference to FIGS. 10A and 10B, at operation 1080 a floorplan loop has not been created, and at 1085 there are no vertices left to join. This indicates that a problem has occurred. At 1087, the vertices that lead to dead ends are deleted. The cost graph (e.g. 1035, 1075) at this point mirrors the floorplan graph with the missing vertex. The cost graph is scanned for vertices that are only attached to another vertex on a single end. This finds the vertex that has a single connection, such as shown with reference to FIG. 27 at 2705. In some embodiments, more than one vertex with a single connection can be located. These vertices are then deleted. After the deletion, in some embodiments, the method 1000A, 1000B may recompute the floor plan by, for example, looping back to step 1005, step 1060, or a different step.

Although the various example embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A machine-implemented method for extracting a floor plan from an imperfect floor plan scan composed of known line segments, comprising:
   using a processor to generate a more-optimized floor plan;
   displaying, by a user device with 3-D depth scanner and a 2-D camera, the more-optimized floor plan;
   receiving feedback indicative of accuracy of the more-optimized floor plan by use of the 3-D depth scanner and the 2-D camera;
   in response to the feedback, using the processor to adjust the more-optimized floor plan based on the feedback;
   wherein receiving feedback indicative of accuracy of the floor plan comprises receiving a wall marking from a reading from the 3-D depth scanner and the 2-D camera, the wall marking comprising multiple positions and multiple orientations of a location in 2-D and 3-D, the wall marking indicated on the user device by a user;
   wherein the processor processes the multiple positions and multiple orientations of a location in 2-D and 3-D to determine a directed line segment, and wherein the directed line segment is added to the known line segments; and
   wherein the processor processes the multiple positions and multiple orientations of a location in 2-D and 3-D to determine a directed line segment further comprises using both depth scanner measurements and camera measurements to determine an average of the multiple positions and the multiple orientations.

2. The machine-implemented method of claim 1, wherein applying a heuristic to the floor plan comprises:
   for each line segment within the known line segments, extending the line segment by a known amount creating an associated with the line segment with a same orientation, and creating a second line segment of a second size perpendicular to and touching the line segment, creating extended line segments; and
   adding the extended line segment and the second line segment to a set of extended line segments.

3. The machine-implemented method of claim 2, wherein adding the chosen edge to the floor plan graph comprises adding the possible edge path between the two line segments to the floor plan graph.

4. The machine-implemented method of claim 3, wherein finding a possible end path comprises:
determining a first angle between two nearest ends of the two line segments;
determining a second angle between a far end of a first of the two line segments and a far end of a second of the two line segments; and
when the first angle is below a first threshold amount and the second angle is below a second threshold amount joining the first of the two line segments and the second of the two line segments.

5. The machine-implemented method of claim 4, wherein when the first angle is above the first threshold amount or the second line segment is above the second threshold amount then zig-zagging the two line segments.

6. The machine-Implemented method of claim 5, wherein zigzagging the two line segments comprises creating a new line segment perpendicular to and between the first of the two line segments and extending a near end of the two line segments to the new line segment.

7. The machine-implemented method of claim 6, wherein the cost further comprises adding a weighting value to the cost.

8. The method of claim 2, further comprising for each two extended line segments within the set of extended line segments, adding possible intersections whose line segment orientations are similar to a set of possible intersections, and finding a possible edge path between two line segments associated with the extended line segments.

9. The method of claim 8, further comprising creating a cost graph comprising a vertex set and an edge set, wherein the vertex set comprises vertices representing a midpoint of each line segment, and wherein the edge set comprises edges, each edge comprising an intersection within the set of possible intersections, a starting vertex of the intersection, an ending vertex of the intersection and a cost, wherein the cost includes length from the starting vertex to the ending vertex and aesthetic costs.

10. The method of claim 9, further comprising iteratively:
in the cost graph, choose an edge with a lowest cost, giving a chosen edge;
add the chosen edge to a floor plan graph; and
delete each edge with the starting vertex equal to the chosen edge starting vertex;
until the floor plan graph forms a loop.

11. A system for extracting a floor plan from an imperfect floor plan scan composed of line segments, the system comprising: a memory; a processor in operable communication with the memory, and a user device with a 3-D depth scanner and a 2-D camera, the processor configured to for extracting a floor plan from an imperfect floor plan scan composed of known line segments, comprising:
generating a more-optimized floor plan by applying a heuristic to the imperfect floor plan scan;
displaying, by the user device, the more-optimized floor plan; receiving feedback from a user using the user device indicative of accuracy of the floor plan; and
in response to the feedback, adjusting the more-optimized floor plan based on the feedback;
wherein receiving feedback indicative of accuracy of the floor plan comprises receiving a wall marking from a reading from the 3-D depth scanner and the 2-D camera, the wall marking comprising multiple positions and multiple orientations of a location in 2-D and 3-D, the wall marking indicated on the user device by a user;
wherein the processor processes the multiple positions and multiple orientations of a location in 2-D and 3-D to determine a directed line segment, and wherein the directed line segment is added to the known line segments; and
wherein the processor processes the multiple positions and multiple orientations of a location in 2-D and 3-D to determine a directed line segment further comprises using both depth scanner measurements and camera measurements to determine an average of the multiple positions and the multiple orientations.

12. The system of claim 11, wherein a line segment comprises an orientation, and wherein the known line segments comprises line segments.

13. The system of claim 12, wherein applying a heuristic to the imperfect floor plan scan comprises:
for each line segment within the known line segments, extending the line segment by a known amount creating an extended line segment associated with the line segment with a same orientation, and creating a second line segment of a second size perpendicular to and touching the line segment;
adding the extended line segment and the second line segment to a set of extended line segments;
for each two extended line segments within the set of extended line segments, adding possible intersections whose line segment orientations associated with the extended line segments are similar to a set of possible intersections, and finding a possible edge path between two line segments associated with the extended line segments;
create a cost graph comprising a vertex set and an edge set, wherein the vertex set comprises vertices representing a midpoint of each line segment, and wherein the edge set comprises edges, each edge comprising an intersection within the set of possible intersections, a starting vertex of the intersection, an ending vertex of the intersection and a cost, wherein the cost includes length from the starting vertex to the ending vertex and aesthetic costs; and
iteratively:
in the cost graph, choose an edge with a lowest cost, giving a chosen edge;
add the chosen edge to a floor plan graph; and
delete each edge with the starting vertex equal to a starting edge of the chosen edge;
until the floor plan graph forms a loop.

14. The system of claim 13, wherein receiving feedback from a user using the user device indicative of accuracy of the floor plan comprises the display showing a portion of a structure corresponding to the imperfect floor plan scan, and receiving a purposeful mark made on the display.

15. The system of claim 14, wherein the processor processes the purposeful mark to create a directed line segment, and adds the directed line segment to the known line segments.

16. The system of claim 15, further comprising deleting a vertex when the vertex leads to a dead end.

17. A non-transitory machine-readable storage medium configured with data and instructions which upon execution by at least one processor cause one or more devices to perform a method of extracting a floor plan from an imperfect floor plan scan composed of known line segments, the method comprising:

using a processor to generate a more-optimized floor plan by applying a heuristic to the imperfect floor plan scan;

displaying, by a user device with a 3-D depth scanner and a 2-D camera, the more-optimized floor plan;

receiving feedback indicative of accuracy of the floor plan by use of the user device; and in response to the feedback, using the processor to adjust the more-optimized floor plan based on the feedback;

wherein receiving feedback indicative of accuracy of the floor plan comprises receiving a wall marking from a reading from the 3-D depth scanner and the 2-D camera, the wall marking comprising multiple positions and multiple orientations of a location in 2-D and 3-D, the wall marking indicated on the user device by a user;

wherein the processor processes the multiple positions and multiple orientations of a location in 2-D and 3-D to determine a directed line segment, and wherein the directed line segment is added to the known line segments; and wherein the processor processes the multiple positions and multiple orientations of a location in 2-D and 3-D to determine a directed line segment further comprises using both depth scanner measurements and camera measurements to determine an average of the multiple positions and the multiple orientations.

18. The non-transitory machine-readable storage medium of claim 17, wherein applying a heuristic to the imperfect floor plan scan comprises:

for each line segment within the known line segments, extending the line segment by a known amount creating an extended line segment associated with the line segment with a same orientation, and creating a second line segment of a second size perpendicular to and touching the line segment;

adding the extended line segment and the second line segment to a set of extended line segments;

for each two extended line segments within the set of extended line segments, adding possible intersections, whose line segment orientations associated with the extended line segments are similar, to a set of possible intersections, and finding a possible edge path between two line segments associated with the extended line segments;

create a cost graph comprising a vertex set and an edge set, wherein the vertex set comprises vertices representing a midpoint of each line segment, and wherein the edge set comprises edges, each edge comprising an intersection within the set of possible intersections, a starting vertex of the intersection, an ending vertex of the intersection and a cost, wherein the cost includes length from the starting vertex to the ending vertex and aesthetic costs; and iteratively:

in the cost graph, choose an edge with a lowest cost, giving a chosen edge;

add the chosen edge to a floor plan graph; and delete each edge with the starting vertex equal to a starting vertex of the chosen edge;

until the floor plan graph forms a loop.

19. The non-transitory machine-readable storage medium of claim 18, wherein the user device further comprises a display and wherein receiving feedback from a user using the LiDAR-enabled user device indicative of accuracy of the floor plan comprises the display showing a portion of a structure corresponding to the imperfect floor plan scan, and receiving a purposeful mark made on the display.

20. The non-transitory machine-readable storage medium of claim 19, wherein the more-optimized floor plan is used to modify equipment location at a location represented by the imperfect floor plan scan.

\* \* \* \* \*